United States Patent [19]

Lapohn

[11] 4,309,787
[45] Jan. 12, 1982

[54] METHODS AND APPARATUSES FOR ASSEMBLING WASHER MEMBERS WITH FASTENER MEMBERS

[76] Inventor: Gerhard Lapohn, 4786 W. 220th St., Fairview Park, Ohio 44126

[21] Appl. No.: 69,558

[22] Filed: Aug. 24, 1979

[51] Int. Cl.$^3$ ............................................. B23P 19/08
[52] U.S. Cl. ...................................... 10/155 A; 29/787
[58] Field of Search ........... 10/D. 164, 155 R, 155 A, 10/165, 169; 29/787, 790, 240.5

[56] References Cited

U.S. PATENT DOCUMENTS

| | | | |
|---|---|---|---|
| 3,750,206 | 8/1973 | Pomernacki | 10/155 A |
| 3,896,539 | 7/1975 | Pomernacki | 10/155 A UX |
| 4,020,515 | 5/1977 | Goerke et al. | 10/155 A |

*Primary Examiner*—Mark Rosenbaum
*Attorney, Agent, or Firm*—Robert R. Hussey

[57] ABSTRACT

An improved method and apparatus for assembling washer members with fastener members provides for moving a plurality of one of the fasteners and the washers along a helical path and the other of the fasteners and the washers in a circular path and simultaneously therewith increasing the telescopic assembled relationship between the fasteners and the washers. The apparatus disclosed herein whereby said methods may be practiced includes a base and a wheel having a plurality of pockets about the periphery thereof. The wheel is rotatably mounted on the base and means are provided for continuously rotating the wheel at a predetermined speed. Means are provided for feeding the washers in an oriented position into the pockets in the wheel and means are provided for feeding the fasteners in an oriented position into the pockets in the wheel. A stationary arcuate cam is secured to the base and extends about a portion of the periphery of the wheel after the washers and fasteners are received in the pockets of the wheel. The arcuate cam has an arcuate cam surface for effecting simultaneous relative movement of a plurality of the fasteners and the washers by moving a plurality of one of the fasteners and the washers along a helical path simultaneously therewith increasing the telescopic assembled relationship between the shank portions of a plurality of the fasteners and the washers.

11 Claims, 34 Drawing Figures

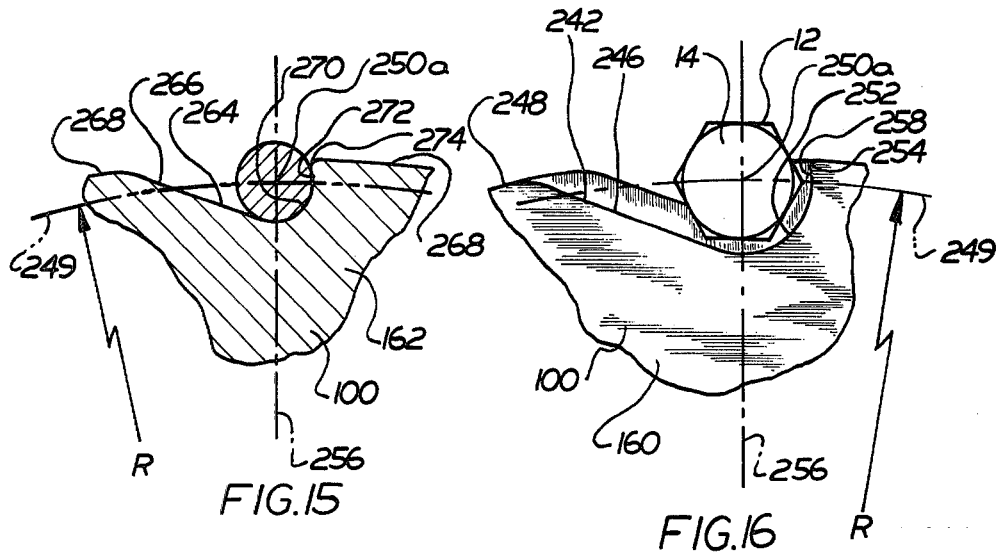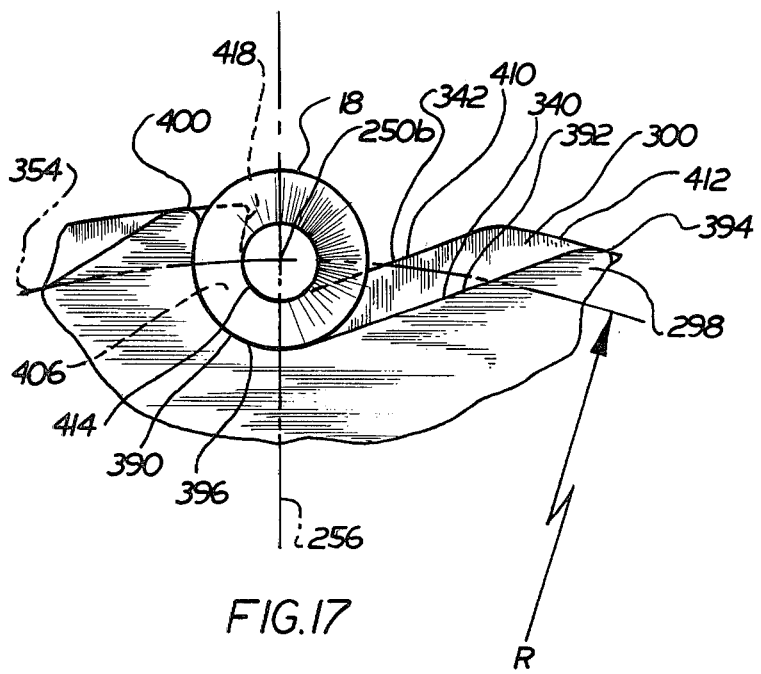

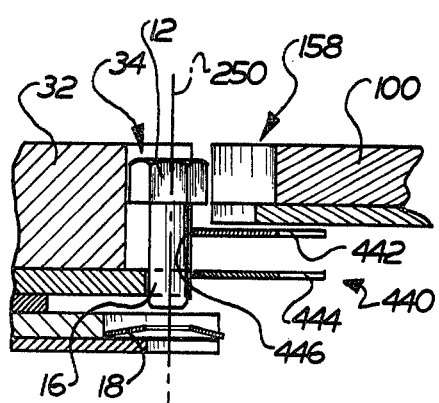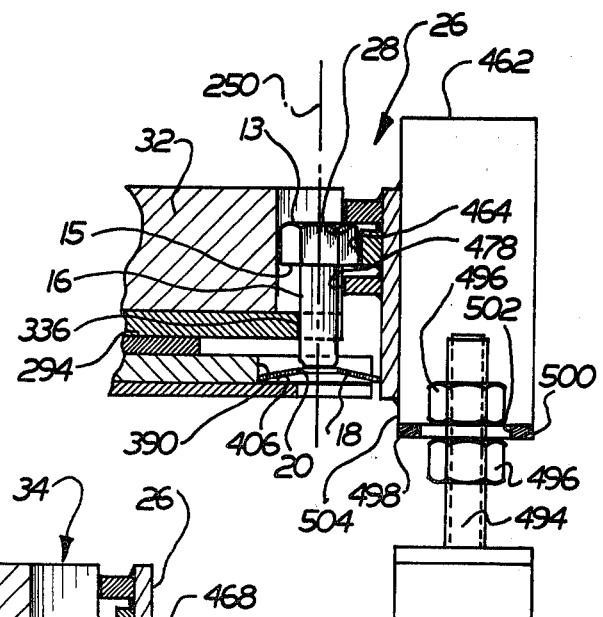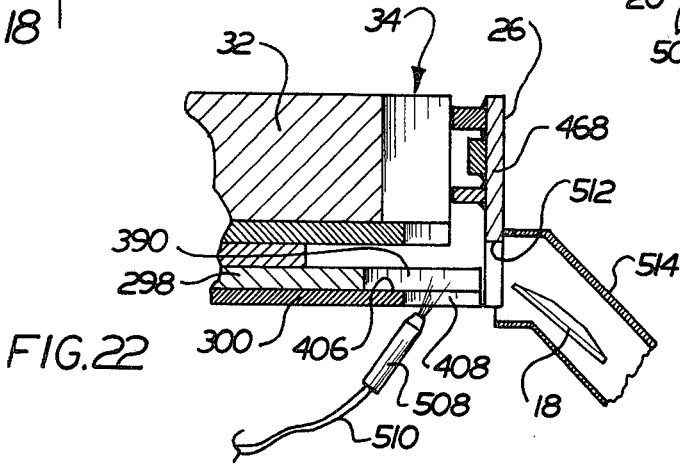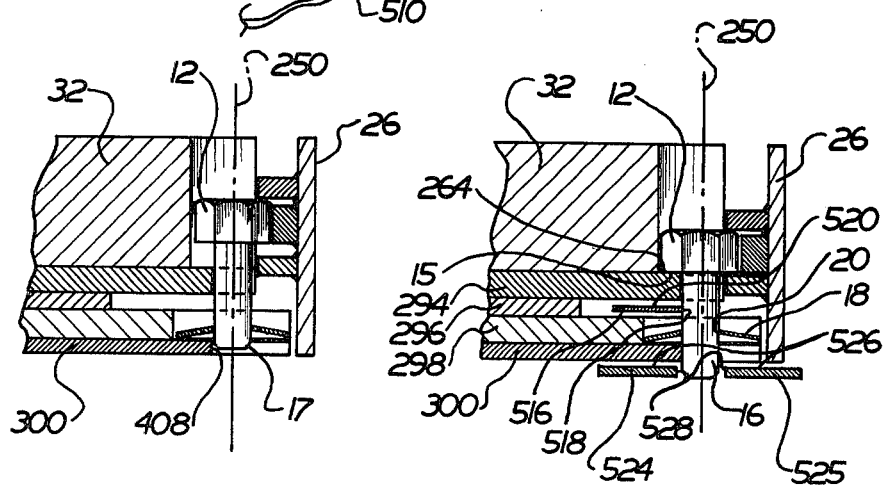

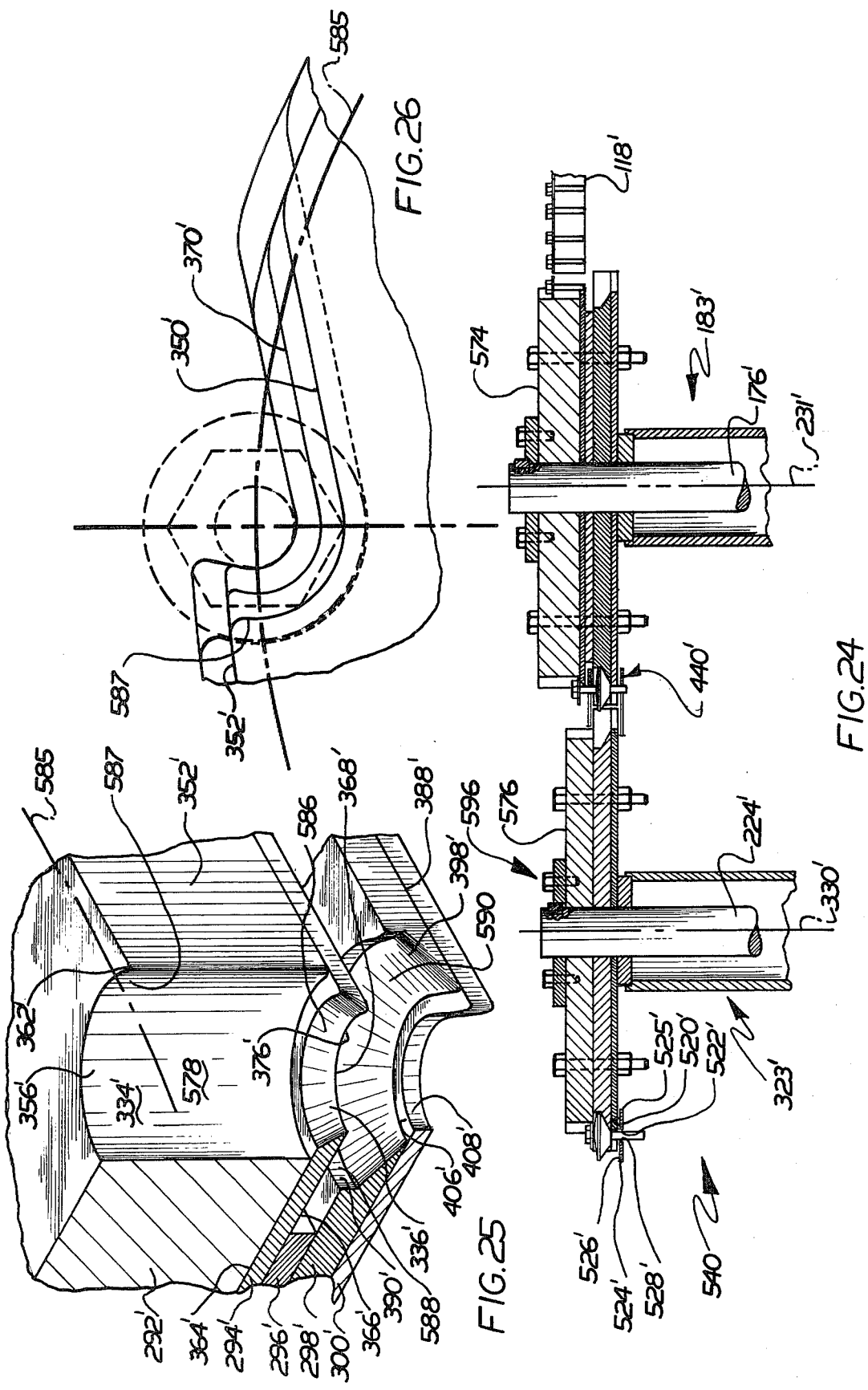

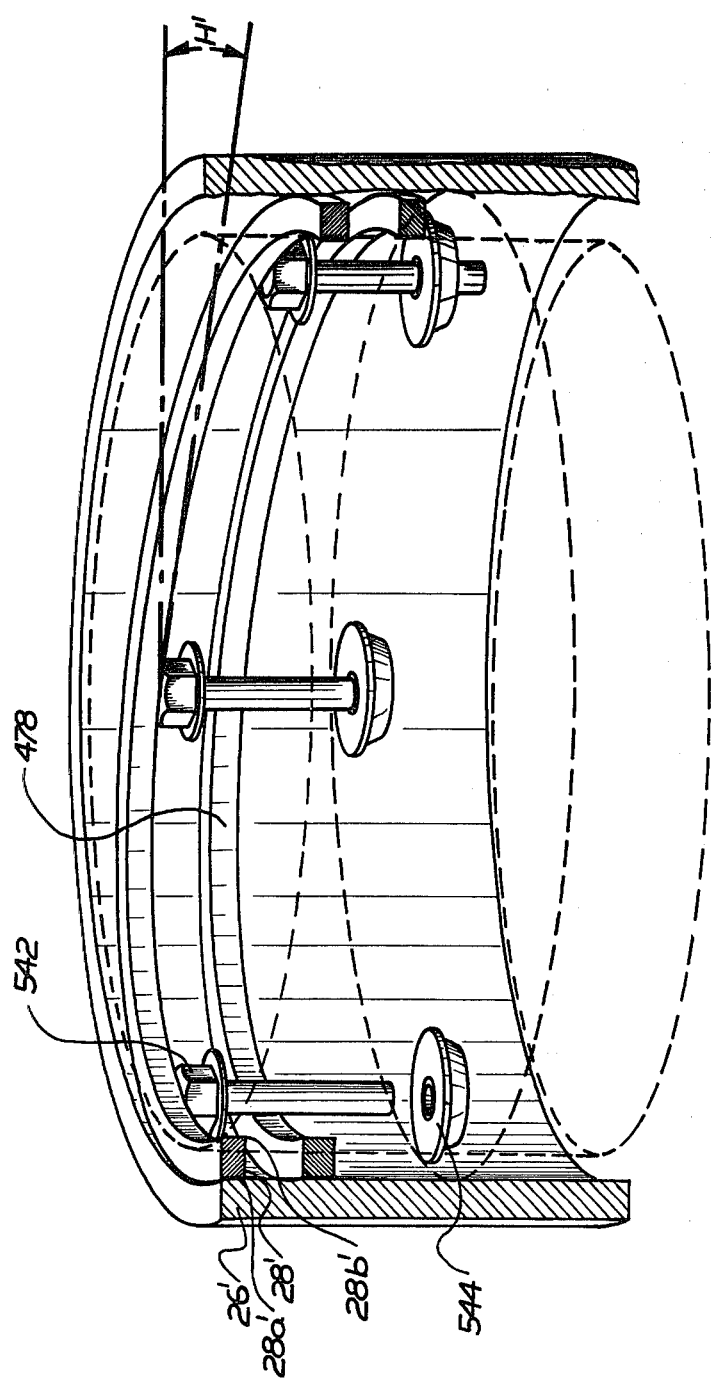

METHODS AND APPARATUSES FOR ASSEMBLING WASHER MEMBERS WITH FASTENER MEMBERS

BACKGROUND OF THE INVENTION

1. Field of the Invention.

This invention relates to a method and apparatus for assembling washer members with fastener members.

2. Description of the Invention.

In the past, various fasteners and washers have been mechanically assembled. The types of fastener/washer assemblies may be generally categorized in two areas, sliding fit assemblies and interference fit assemblies.

In the sliding type fit assemblies, a fastener and washer having a sliding fit therebetween are assembled together. In some cases, subsequent operations are performed on the shank of the fastener of the assemblies such as, for example, thread rolling, forming a ring on the shank, or using the assembly in subsequent assembly operations. Since rolled threads on the shank may be larger in diameter than the opening in the washer, the washer is retained on the shank after the threads are formed. When a ring is formed on the shank of the fastener the washer is retained on the shank of the fastener. In other cases, the assembly may be fed to subsequent automatic assembly operations for securing different parts together with the washer/fastener assembly.

In the interference type fit washer/fastener assembly there is an interference fit between the washer and the shank of the fastener requiring some force, dependent on the amount of the interference fit, to assemble fasteners and washers. Other subsequent operations may be performed on interference fit type assemblies such as described above in connection with the sliding fit type assemblies.

In the assembly of washers and fasteners, it is highly desirable to assemble the parts at a high rate of speed to maintain the production rates of associated equipment. Substantial advances have been made in the rates at which the manufacturing equipment can form fasteners and washers. The equipment used to perform subsequent operations on the fastener and washer assemblies have also been developed to reach higher speeds. For example, rotary thread rolling equipment is now available with a capability of forming threads on a fastener up to 800 parts per minute and equipment for forming a ring on the shank of the fastener has operated at the rate of 6,000 parts per minute. It is highly desirable to assemble washers and fasteners at a rate that is compatible with the associated equipment so that assembly of the washers and fasteners does not act as a bottleneck in the production process.

Known methods and apparatuses for assembling a washer and a fastener have required the use of intermittent motion devices which impede the rate at which the washers and fasteners may be assembled. One such known method and apparatus is disclosed in Pomernacki, U.S. Pat. Nos. 3,750,206 and 3,896,539. Such a method and apparatus has provided leaf springs to urge the fasteners and washers into an assembled relationship at the particular point of contact of the spring and fastener. These springs do not provide a smooth, even, continually sliding movement of the fastener into assembled relationship with the washer but rather require an abrupt or "intermittent" movement of the fastener at a particular point. Such intermittent type motion impedes the rate at which such a method and apparatus may be operated. In addition, the leaf spring "floats" at higher speeds since there is not sufficient time for the spring finger to move. Furthermore, the leaf springs do not provide any positive assembly positioning of the washers and fasteners and may flex and move in various directions which creates misalignment of the washer during the assembly process. Another problem of using leaf springs to assemble washers and fasteners arises in the assembly of washers and fasteners of the interference fit type. Such substantial forces are necessary to assemble these parts, that when such an apparatus is operated at a high rate of speed, the leaf springs are rendered ineffective. Such a method and apparatus also provides a reciprocating spring-loaded finger to position the fasteners as they are fed. Such an "intermittent" motion device limits the speed of such a method and apparatus.

Another known apparatus provides reciprocating spring-loaded feeder bars for feeding fasteners and washers into cleats on a straight line commercially available conveyor chain. Each of the cleats has a cavity therein for receiving a washer and a fastener. A linear surface is provided along a linear portion of the cleats to move the washers and fasteners together. Such an "intermittent" type feeder design limits the speed of such an apparatus. Certain problems incurred at higher speeds of such an apparatus include the timing of the cleats with the feeder bars, "floating" of the feeder bar, the relatively horizontal position of the fasteners and relatively vertical position of the fasteners as they are fed into the cleats and the washers and fasteners are free to move in the cleats.

Another problem of such an apparatus when operated at higher speeds is a change in dimension between the cleats since the chain on which the cleats are mounted may change in dimension. If the chain is in tension, such as when it is pulled, the chain may stretch and the cleats move out of alignment. If, on the other hand the chain is in compression, such as when it is pushed, it may buckle and the cleats move out of alignment. In addition, contaminants may build up between the cleats to move the cleats out of alignment. Another problem of such an apparatus at higher speeds is that continuous feeding of the part cannot be provided since there is no continuous surface upon which to feed. In addition, the design of such a machine is severely restricted in that commercially available chain is used. Generally, commercially available chain is not available in a size which corresponds to the size of various fasteners which are desired to be assembled by such a machine and undesired spacing between the fasteners is necessary. Another problem of such a machine when operated at higher speeds is the control of the conveyor chain and consequently the cleats thereon. Such a machine does not provide for controlling the movement of the chain and cleats in the lateral direction that is the direction at 90° to the direction of motion of the conveyor.

The present invention relates to a method and apparatus for assembling washer members with fastener members at a high rate of speed. Such a high rate of speed is provided by assembling the washers and fasteners together with an even, smooth, continuous motion to allow such high production rates to be achieved.

Methods and apparatuses of the present invention provide for moving a plurality of one of the fasteners.

and the washers along a helical path and the other of the fasteners and the washers in a circular path and simultaneously therewith increasing the telescopic assembled relationship between the fasteners and the washers. An apparatus described herein whereby said methods may be practiced includes a base and an assembly wheel having a plurality of pockets about the periphery thereof. The assembly wheel is rotatably mounted on the base and means are provided for continuously rotating the wheel at predetermined speeds. Means are provided for feeding the washers in an oriented position into the pockets in the wheel. The pockets have a hook portion downstream of the direction of rotation of the wheel for retaining one of the washers in an oriented position in the pocket of the wheel. Means are provided for feeding the fasteners in an oriented position into the pockets of the wheel. The hook portion receives a fastener from the feeding means and retains the fastener in an oriented position in the pocket and also provides for alignment between the washer and fastener as they are assembled. A stationary arcuate cam is secured to the base and extends about a periphery of the wheel after the fasteners and washers are received in the pockets in the wheel. The arcuate cam has an arcuate cam surface for effecting simultaneous relative movement of a plurality of the fasteners and washers, by moving a plurality of one of the fasteners and washers along a helical path and simultaneously therewith increasing the telescopic assembled relationship between the shank portions of a plurality of the fasteners and the washers.

The apparatus of the present invention is capable of assembling washers and fasteners of both the sliding fit type and the interference fit type. During assembly of the washers and fasteners, the present invention provides for the positive control of each of the parts as they are assembled and is capable of exerting substantial forces to move the washers and fasteners, particularly of the interference fit type, together. The present invention also provides for a washer/fastener assembling apparatus having less moving parts which minimizes the cost of manufacture of such an apparatus, the timing problems realized when a number of moving parts are required, and also the problems that may be incurred during the use of the machine in production. The apparatus of the present invention does not require any "intermittent" type moving parts during the assembly of the washers and fasteners.

BRIEF DESCRIPTION OF THE DRAWINGS

A more complete understanding of the invention may be had from the following drawings and specification.

In the drawings:

FIG. 15 is a cross-sectional view of a portion of the feeder wheel and fastener feeder shown in FIG. 10 and taken along line 15—15 thereof.

FIG. 16 is an enlarged plan view of a portion of the feeder wheel and fastener feeder shown in FIG. 9.

FIG. 17 is an enlarged sectional view of a portion of the assembly wheel shown in FIG. 14 and taken along line 17—17 thereof.

FIG. 18 is a cross-sectional view of FIG. 13 and taken along line 18—18 thereof.

FIG. 19 is a cross-sectional view of a portion of the apparatus shown in FIG. 4 and taken along line 19 thereof.

FIG. 20 is a cross-sectional view of a portion of the apparatus shown in FIG. 4 and taken along line 20—20 thereof.

FIG. 21 is a partial sectional view of a portion of the apparatus shown in FIG. 4 and taken along line 21—21 thereof.

FIG. 22 is a partial cross-sectional view of the apparatus shown in FIG. 4 and taken along line 22—22 thereof.

FIG. 24 is a sectional view of the apparatus shown in FIG. 23 and taken substantially along line 24—24 thereof.

FIG. 25 is an enlarged fragmentary perpspective view of a portion of the first assembly wheel shown in FIG. 23.

FIG. 26 is an enlarged fragmentary plan view of a portion of the first assembly wheel shown in FIG. 23.

FIG. 27 is a schematic perspective view showing the partial assembly of the fastener and washer in the first assembly wheel of the apparatus shown in FIG. 23.

DETAILED DESCRIPTION OF THE INVENTION

The present invention provides a method and apparatus for assembling washer members on the axially extending shank portions of fastener members by moving a plurality of one of the fasteners and the washers along a helical path and the other of the fasteners and the washers in a circular path and simultaneously therewith increasing the telescopic assembled relationship between the fasteners and the washers. The present invention may be applied to methods and apparatuses for assembling both washers and fasteners of the sliding fit type and washers and fasteners of the interference fit type. For purposes of illustration in connection with washers and fasteners of the sliding fit type, the apparatus 10 is hereinafter further described.

Figure 1:
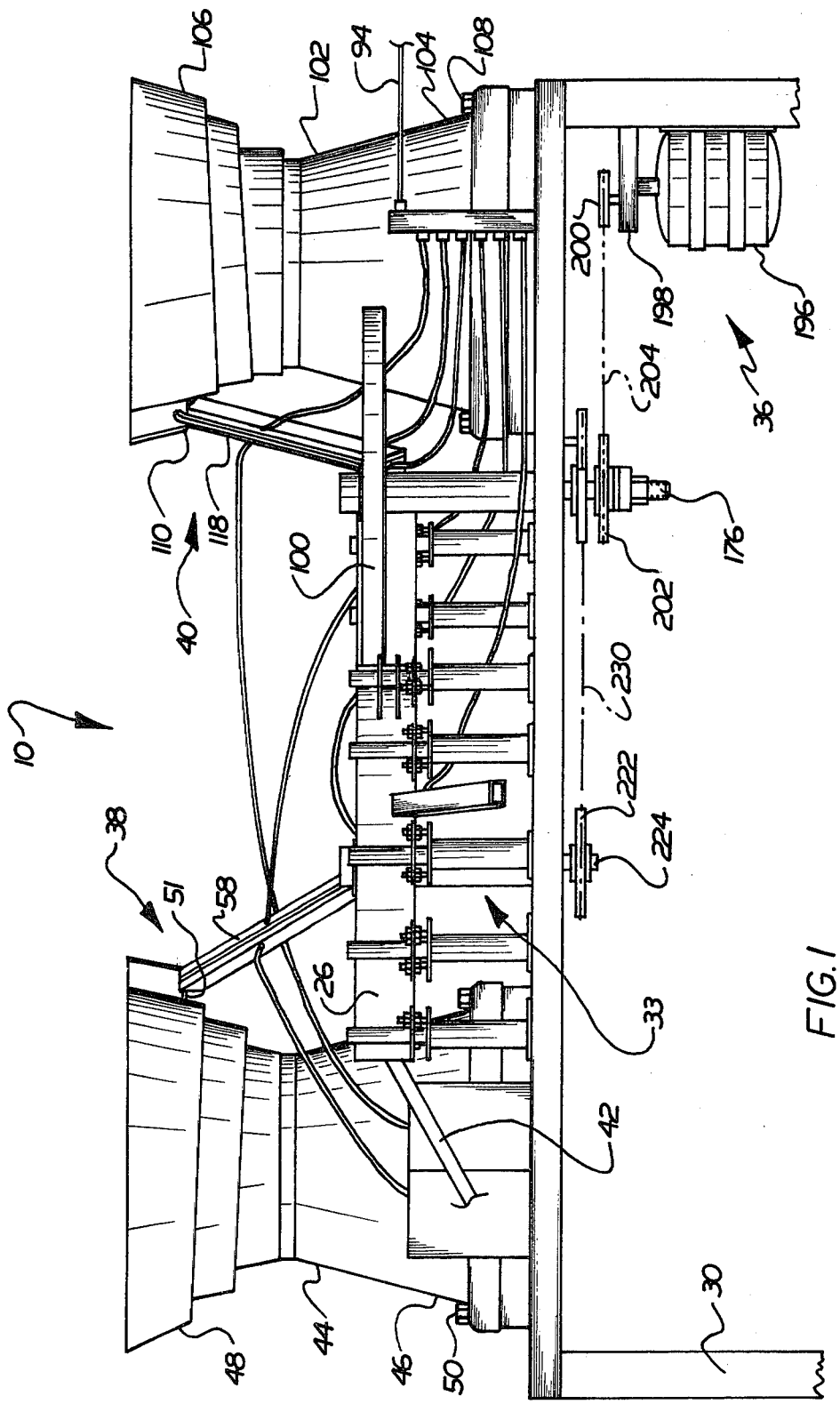
FIG. 1 is a side elevation view of an apparatus for assembling washer members and fastener members of the sliding fit type which is representative of one embodiment of the present invention.
Figure 3:
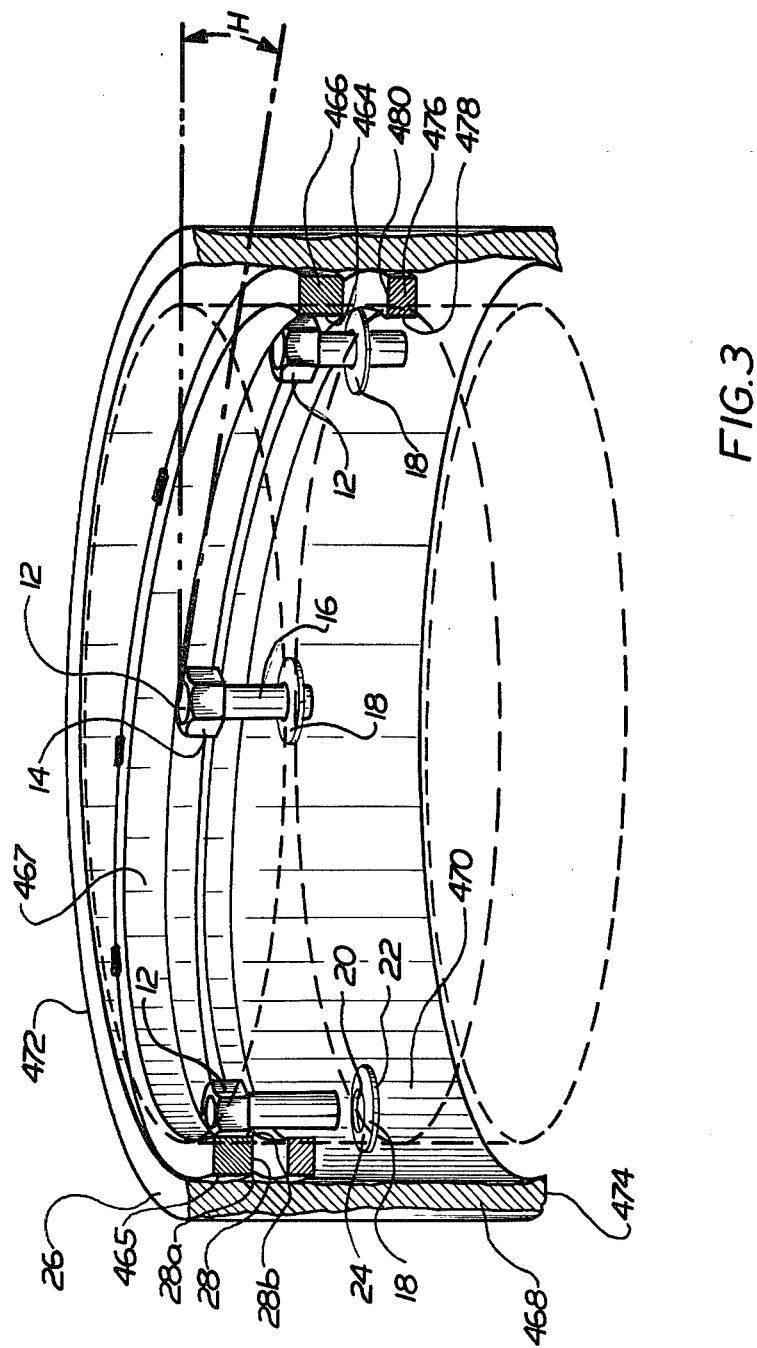
FIG. 3 is an enlarged schematic perspective view of the fasteners and washers during assembly thereof.

The apparatus 10 as seen in FIG. 1 is provided to assemble the fasteners 12 having an enlarged portion or fastener head 14 and an elongated axially extending shank portion 16 with washer members 18 having an opening 20 therein, as seen in FIG. 3. The washer 18 is generally circular in configuration and has an outer peripheral surface 22 with an upper beveled side 24 and corresponding lower beveled side between the inner peripheral surface or opening 20 of the washer 18 and the outer peripheral surface 22. In a sliding fit type of fastener/washer assembly such as the fastener 12 and washer 18, when the shank 16 is positioned and maintained in alignment with the opening 20, the fastener and washer 12, 18 respectively, may be assembled by any small force, such as gravity, when alignment is maintained between the opening 20 and the shank 16. Of course, the speed at which such an assembly process may be accomplished is increased by increasing the rate at which the fastener 12 and washer 18 are assembled while maintaining alignment therebetween.

The apparatus 10 includes an arcuate cam 26 as seen in FIG. 3 having an arcuate cam surface 28 for effecting simultaneous relative movement of a plurality of the fasteners 12 and washers 18 by moving a plurality of the fasteners 12 along a helical path and a plurality of the washers 18 in a circular path and simultaneously therewith increasing the telescopic assembled relationship between the shank portions 16 thereof and the washers 18, as will be hereinafter more fully described. It should be understood that it is within the scope of this invention to move the washers in a helical path and the fasteners in a circular path.

Figure 2:
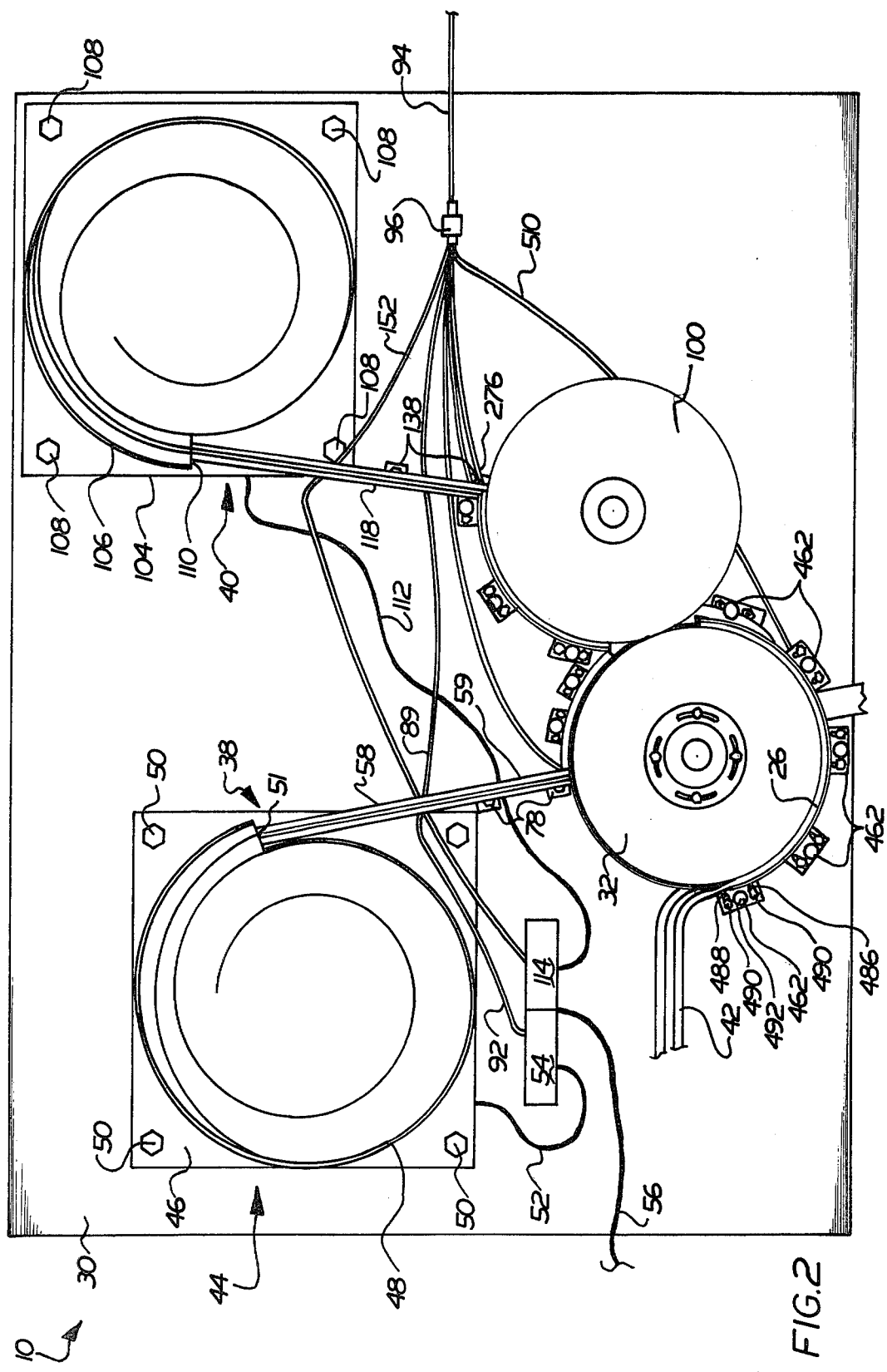
FIG. 2 is a plan view of the apparatus showing a feeder wheel and an assembly wheel.
Figure 4:
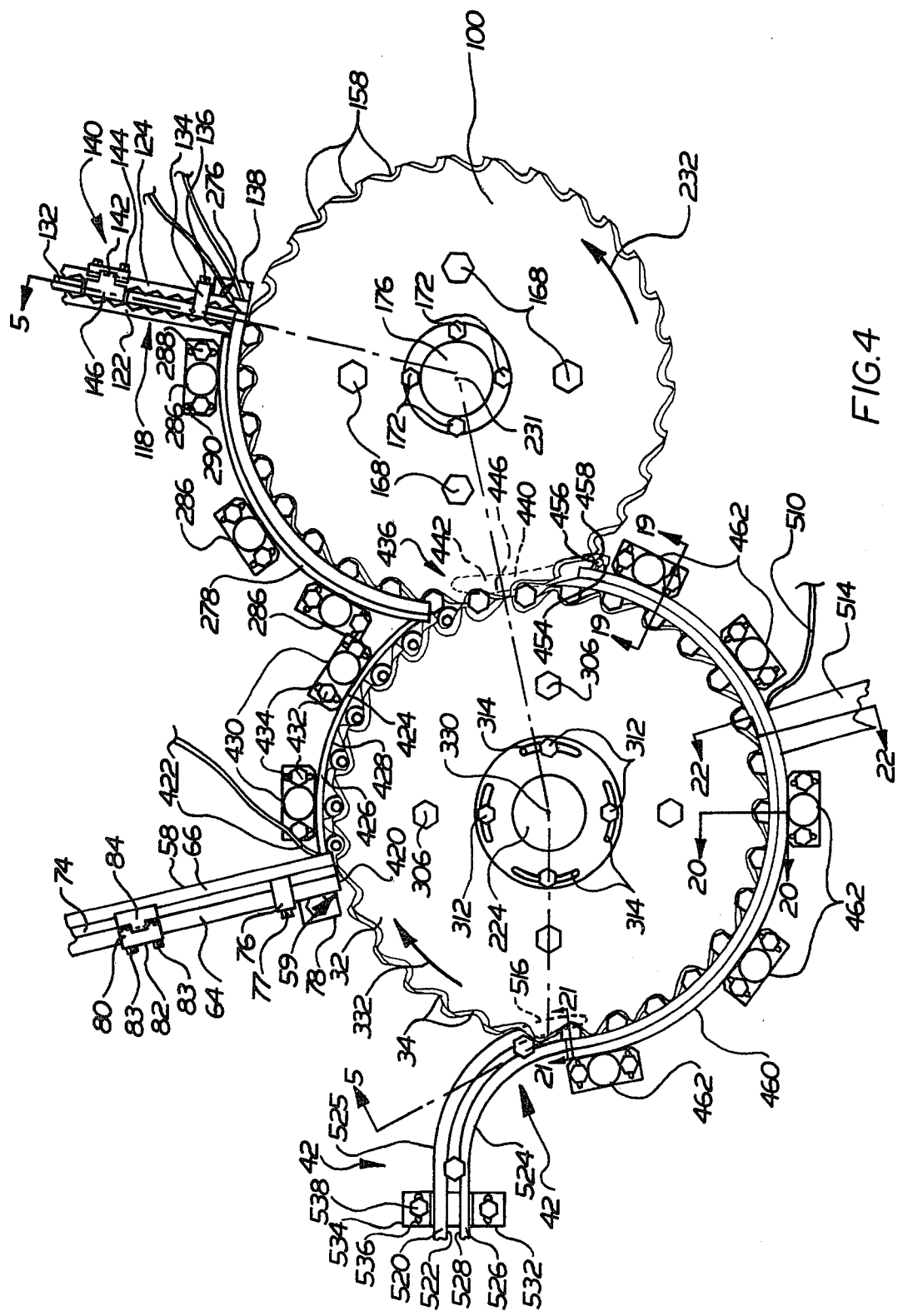
FIG. 4 is an enlarged plan view of the feeder and assembly wheels having pockets therein as shown in FIG. 2.

The apparatus, generally indicated at 10 in FIG. 1, includes a base 30 and an assembly wheel 32 having a plurality of pockets 34 about the periphery thereof as seen in FIGS. 2 and 4. The assembly wheel 32 is rotatably mounted on the base 30 by means 33 as will be hereinafter more fully described. The apparatus 10 also includes means for rotating the assembly wheel, generally indicated at 36 in FIG. 1, and means for feeding the washers and means for feeding the fasteners to the assembly wheel which means are generally indicated at 38, 40 respectively in FIGS. 1 and 2. It is preferable to feed the washers into the pockets 34 of the assembly wheel 32 before the fasteners to avoid any jamming that may occur as a result of the improper vertical positioning or movement of the fastener. The apparatus 10 also includes means, generally indicated at 42 in FIGS. 1 and 2, for removing the washer/fastener assembly from the assembly wheel 32.

The means 38 for feeding washers to the assembly wheel 32 includes a vibratory feeder 44 having a base 46 and a bowl 48 as seen in FIGS. 1 and 2. The base 46 of the vibratory feeder 44 is secured to the base 30 of the apparatus 10 by any conventional means such as the fasteners 50. The geometric configuration of the bowl 48 is designed dependent on the particular shape of the washer 18 and has a geometric configuration wherein a quantity of unoriented washers may be deposited in the bowl 48. Upon operation of the vibratory feeder 44, the washers are oriented and fed from the outlet 51 of the bowl 48 in an oriented position. The vibratory feeder 44 may be of any conventional design well known to those skilled in the art.

When electrical power is supplied through the electrical connection 52 to the base 46 of the feeder 44, the bowl is caused to be vibrated, thereby feeding oriented washers from the outlet 51 of the bowl 48. A switch is provided for selectively connecting and disconnecting the power supplied from the power supply conduit 56 with the base 46 of the feeder, as will be further hereinafter described. Accordingly, when no power is supplied to the base 46 of the vibratory feeder 44, no washers are fed from the outlet 51 and when power is supplied to the base 46, oriented washers are fed from the outlet 51 of the bowl 48.

The means for feeding the washers 38 to the assembly wheel 32 also includes a track 58. The track 58 provides for the movement of the washers from the outlet 51 of the vibratory feeder 44 to the assembly wheel 32 while maintaining the washers in an oriented position.

The bowl 48 is positioned so that its outlet 51 is positioned substantially above the assembly wheel 32. The track 58 has a general configuration sloping downwardly from the outlet 51 to a feed portion 59 of the track 58. The downwardly extending portion of the track 58 has a sufficient slope and is capable of retaining a sufficient number of washers therein so as to provide a sufficient force on the washers to be fed from the track, as will be hereinafter more fully described.

Figures 7, 8:
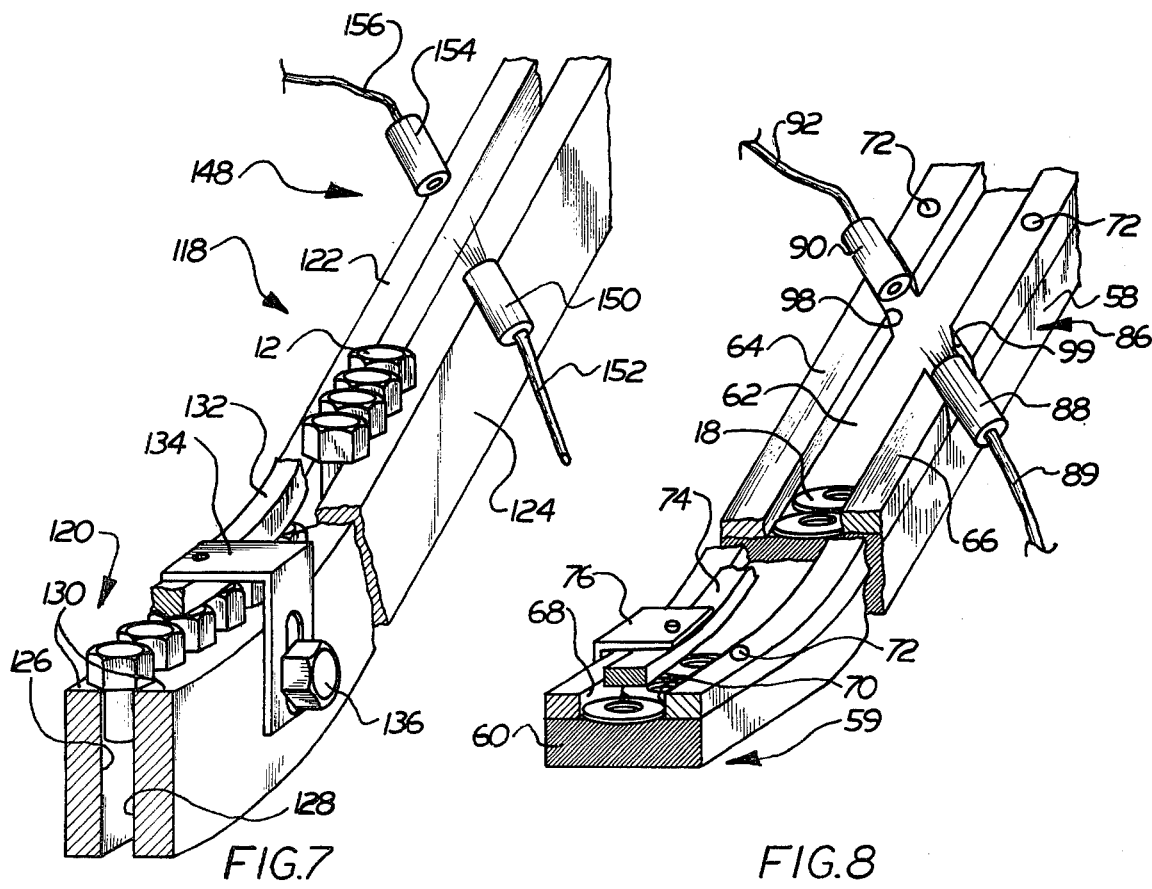
FIG. 7 is an enlarged perspective view of a portion of the fastener feeder shown in FIG. 1.
FIG. 8 is an enlarged perspective view of a portion of the washer feeder shown in FIG. 1.

As seen in FIG. 8, the track 58 has a bottom member 60 with an upper surface 62 for supporting the washers thereon and side members 64, 66. The side members 64, 66 have inner washer guide surfaces 68, 70, respectively, to guide the washers 18 as they slide down the track 58 on the bottom member 60. The guide surfaces 68, 70 are positioned opposite each other a distance slightly greater than the outer diameter of the washer 18 to allow for the free flow of washers down the track 58. The side members 64, 66 are secured to the bottom member 60 by any conventional means such as the fasteners 72.

The track 58 also includes an upper retaining member 74 which is secured to the bottom member 60 by the support member 76. The support member 76 has a slot therein to allow for the vertical adjustment of the upper retaining member 74 when the fastener 77 is loosened as seen in FIG. 4. When the fastener 77 is loosened, the upper retaining member 74 may be adjusted. The upper retaining member 74 is positioned above the washers 18 and is spaced therefrom a sufficient distance to allow the free flow of the washers along the track 58 yet sufficiently close to the washer support surface 62 so as to maintain the washers in an oriented and aligned position.

It should be understood that the positioning of the members 60, 64, 66 and 74 are substantially the same throughout the length of the track 58 and are shaped to accept washers from the outlet 51 of the vibratory feeder 44 and provide for the movement of the washers therefrom to the assembly wheel 32 in an oriented position. Track support members 78, shown in FIG. 2, are provided to secure the track 58 to the base 30 so that the track has one end positioned adjacent to the outlet 51 of the vibratory feeder 44 and its other end adjacent to the assembly wheel 32.

In some cases, it is desirable to provide access to the washers carried in the track 58. Accordingly, a gate 80 is provided having a hinged portion 82 adjustably secured to the bottom member 60 by means of fasteners 83, as shown in FIG. 4. The hinged portion 82 has slots therein to provide vertical adjustment of the upper retaining member portion 84 of the gate 80. The retaining portion 84 is hinged to the hinge portion 82 of the gate 80. Accordingly, the upper retaining member portion 84 may be adjusted so as to coincide with the upper retaining member 74 so that the flow of the washers is not impaired.

A washer sensor 86 is provided to sense when a sufficient number of washers are in the track 58 to provide a sufficient force on the washer to be fed therefrom as seen in FIGS. 2 and 8. When additional washers are needed in the track 58, the washer sensor 86 actuates the vibratory feeder 44 so that additional washers are fed into the track in an oriented position. When sufficient washers are in the track 58, electrical power is not provided to the vibratory feeder and no washers are fed therefrom.

The washer sensor 86 includes a head 88 which receives pressurized air from the conduit 89 and directs that pressurized air towards the sensing head 90 of the washer sensor 86. The conduit 89 is connected to a source of pressurized air 94 through a manifold 96. The sensing head 90 has a conduit 92 attached thereto which senses the presence of pressurized air and sends a signal to the switch 54 through the conduit 92. The head 88 and sensing head 90 are mounted on the track 58 and positioned in the openings 98, 99 in the side members 64, 66 thereof so that the pressurized air flows across the washer supporting surface 62.

When the sensing head 90 senses the presence of pressurized air, the switch 54 connects the electrical supply 56 to the vibratory feeder 44 so that washers are fed in an oriented position down the track 58 from the vibratory feeder 44. When a predetermined number of washers are received in the track, the washers present between the head 88 and sensing head 90 interrupt the flow of pressurized air therebetween. When the sensing head 90 senses that no pressurized air is present, the switch 54 disconnects the electrical supply 56 from the vibratory feeder so that additional washers are not fed. Such a switching mechanism minimizes any potential jamming of washers that may occur if an excessive number of washers are fed down the track and allows for controlling the flow of washers 18 along the track 58.

It should be understood that it is within the comtemplation of this invention to provide any sensing means for sensing the presence of washers 18 in the track 58 at a predetermined level. It should be further understood that the means for feeding washers 38 to the assembly wheel 32 may be of any design which is capable of feeding washers in an oriented position to the assembly wheel 32 with a predetermined force urging the washers toward the wheel 32 as will be hereinafter more fully described.

The means 40 for feeding fasteners to the feed wheel 100 includes a vibratory feeder 102 having a base 104 and a bowl 106 as seen in FIGS. 1, 2 and 7. The base 104 of the vibratory feeder 102 is secured to the base 30 of the apparatus 10 by any conventional means such as the fasteners 108. The geometric configuration of the bowl 106 is designed dependent on the particular shape of the fastener and has a geometric configuration wherein a quantity of unoriented fasteners may be deposited in the bowl 106. Upon operation of the vibratory feeder 102, the fasteners are oriented and fed from the outlet 110 of the bowl 106 in an oriented position. The vibratory feeder 102 may be of any conventional design well known to those skilled in the art.

When the electrical power is supplied through the electrical connection 112 to the base 104 of the feeder 102, the bowl is caused to be vibrated, thereby feeding oriented fasteners from the outlet 110 of the bowl 106. A switch 114 is provided for selectively connecting and disconnecting the power supplied from the power supply conduit 116 with the base 104 of the feeder, as will be further hereinafter described. Accordingly, when no power is supplied to the base 104 of the vibratory feeder 102, no fasteners are fed from the outlet 110 and when power is supplied to the base 104, oriented fasteners are fed from the outlet 110 of the bowl 106.

The means for feeding the fasteners 40 to the feed wheel 100 also includes a track 118. The track 118 provides for the movement of the fasteners from the outlet 110 of the vibratory feeder 102 to the feeder wheel 100 while maintaining the fasteners in an oriented position.

The bowl 106 is positioned so that its outlet 110 is positioned substantially above the feed wheel 100. The track 118 has a general configuration sloping downwardly from the outlet 110 to a feed portion 120 of the track 118. The downwardly extending portion of the track 118 has a sufficient slope and is capable of retaining a sufficient number of fastener therein so as to provide a sufficient force on the fasteners to be fed from the track, as will be hereinafter more fully described.

The track 118 has side members 122, 124. The side members 122, 124 have inner fastener guide surfaces 126, 128 respectively, the upper fastener guide surfaces 130 to guide the fasteners 12 as they slide down the track 118 as seen in FIG. 7. The guide surfaces 126, 128 are positioned opposite each other a distance slightly greater than the outer diameter of the shank 16 of the fastener 12 to allow for the free flow of fasteners down the track 118. The side members 122, 124 are secured to the base 30 by any conventional means such as the track supports 138 as will be further described.

The track 118 also includes an upper retaining member 132 which is secured to the side member 124 by the support member 134. The support member 134 has a slot therein to allow for the vertical adjustment of the upper retaining member 132 when the fastener 136 is loosened as seen in FIG. 7. When the fastener 136 is tightened, the upper retaining member 132 may be adjusted. The upper retaining member 132 is positioned above the fasteners 12 and is spaced therefrom a sufficient distance to allow the free flow of the fasteners along the track 118 yet sufficiently close to the heads 14 of the fasteners 12 so as to maintain the fasteners in an oriented and aligned position.

It should be understood that the positioning of the members 122, 124 and 132 are substantially the same throughout the length of the track 118 and are shaped to accept fasteners from the outlet 110 of the vibratory feeder 102 and provide for the movement of the fasteners therefrom to the feed wheel 100 in an oriented position. The track support members 138 are provided to secure the track 118 to the base 30 so that the track has one end positioned adjacent to the outlet 110 of the vibratory feeder 102 and its other end adjacent to the feed wheel 100.

In some cases, it is desirable to provide access to the fasteners carried in the track 118. Accordingly, a gate 140 is provided having a hinge portion 142 adjustably secured to the base 30 by means of fasteners 144 as seen in FIG. 4. The hinge portion 142 has slots therein to provide vertical adjustment of the upper retaining member portion 146 of the gate 140. The retaining portion 146 is hinged to the hinge portion 142 of the gate 140. Accordingly, the upper retaining member portion 146 may be adjusted so as to coincide with the upper retaining member 132 so that the flow of the fasteners is not impaired.

A fastener sensor 148 is provided to sense when a sufficient number of fasteners are in the track 118 to provide a sufficient force on the fastener to be fed therefrom. When additional fasteners are needed in the track 118, the fastener sensor actuates the vibratory feeder 102 so that additional fasteners are fed into the track in an oriented position. When sufficient fasteners are in the track, electrical power is not provided to the vibratory feeder and no fasteners are fed therefrom.

The fastener sensor 148 includes a head 150 which receives pressurized air from the conduit 152 and directs that pressurized air towards the sensing head 154 of the fastener sensor 148. The conduit 152 is connected to a source of pressurized air 94 through a manifold 96. The sensing head 154 has a conduit 156 attached thereto which senses the presence of pressurized air and sends a signal to the switch 114 through the conduit 156. The head 150 and sensing head 154 are mounted on the track 118 and positioned on and secured to the side members 122, 124 so that the pressurized air flows across the heads 14 of the fasteners 12 so that the flow of pressurized air thereacross is interrupted by the presence of fasteners between the heads 150, 154.

When the sensing head 150 senses the presence of pressurized air, the switch 114 connects the electrical supply 56 to the vibratory feeder 102 so that fasteners are fed in an oriented position down the track 118 from the vibratory feeder 102. When a predetermined number of fasteners are received in the track, the fasteners are present between the head 150 and sensing head 154 and interrupt the flow of pressurized air therebetween. When the sensing head 154 senses that no pressurized air is present, the switch 114 disconnects the electrical supply 56 from the vibratory feeder so that additional fasteners are not fed. Such a switching mechanism minimizes any potential jamming of fasteners that may occur if an excessive number of fasteners are fed down the track and allows for controlling the flow of fasteners 12 along the track 118.

It should be understood that it is within the contemplation of this invention to provide any sensing means for sensing the presence of fasteners 12 in the track 118 at a predetermined level. It should be further understood that the means for feeding fasteners 40 to the feed wheel 100 may be of any design which is capable of feeding fasteners in an oriented position to the feed wheel 100 with a predetermined force urging the fasteners toward the wheel 100 as will be hereinafter more fully described.

Figure 5:
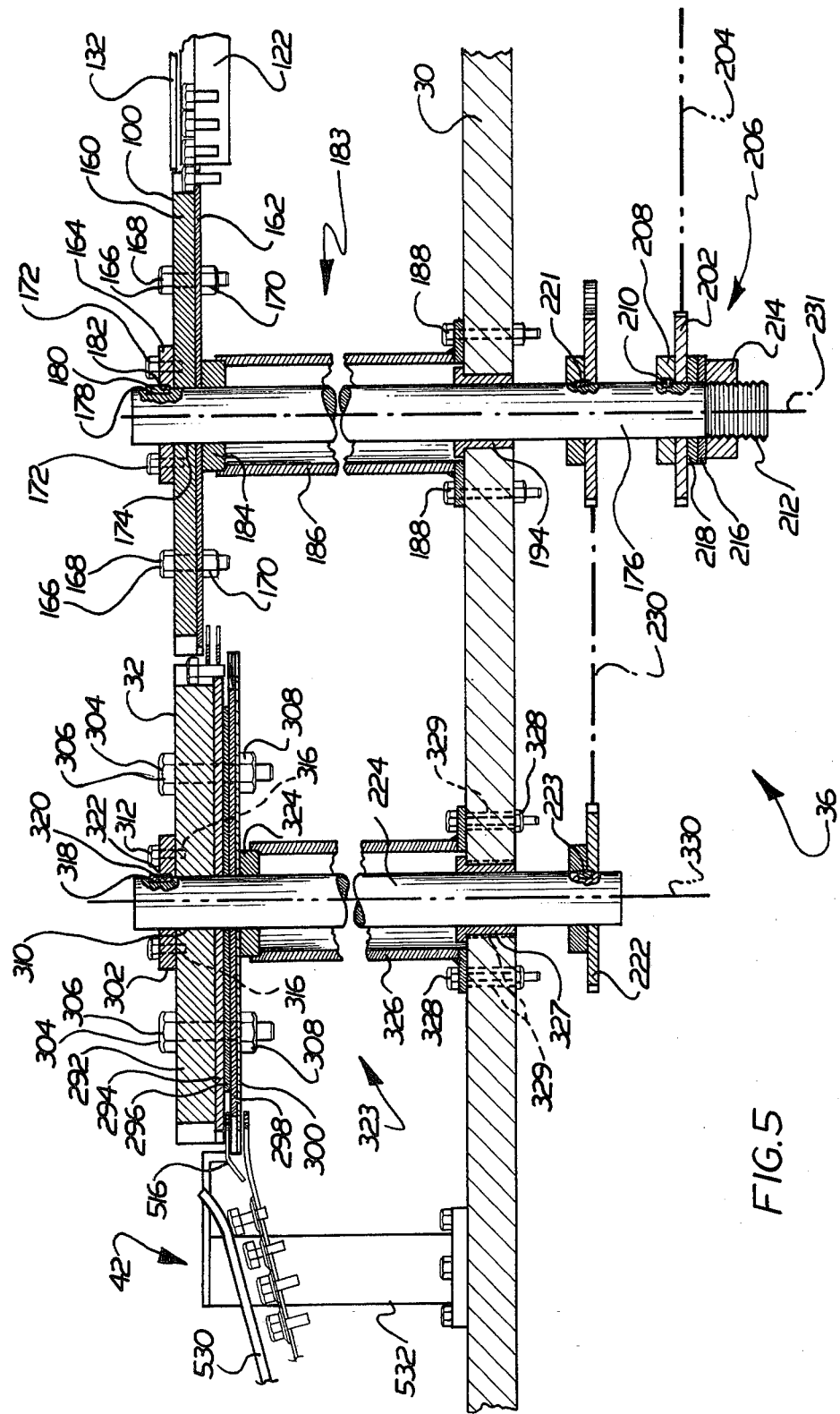
FIG. 5 is a cross-sectional view of the assembling apparatus disclosed in FIG. 4 and taken along line 5—5 thereof.

The means 40 for feeding the fasteners includes the feed wheel 100 having a plurality of pockets 158 equally spaced about the periphery thereof as seen in FIG. 4. The feed wheel 100 includes an upper disc 160, a lower disc 162 and a collar 164, as seen in FIGS. 4 and 5, which are secured together by any conventional means such as the threaded fastener assemblies 166. The threaded fastener assemblies 166 include a bolt 168 and a nut 170. The bolts 168 are received in aligned openings through the discs 160, 162. The upper and lower discs 160, 162 are secured together by use of the nuts 170 and bolts 168 passing through each of the aligned openings.

The collar 164 is secured to the upper disc 160 by bolts 172. The bolts 172 pass through openings in the collar 164 and are threadedly engaged by threaded openings in the upper disc 160.

An aligned central opening 174 is provided through the upper disc 160, lower disc 162 and collar 164 for receiving the drive shaft 176 therethrough. The drive shaft 176 has a keyway 178 for receiving one portion of the key 180 therein. A keyway 182 is provided in the collar 164 for receiving the other portion of the key 180 therein. Accordingly, a driving connection is effected between the feed wheel 100 and the drive shaft 176.

The feed wheel 100 is rotatably supported on the base 30 by the drive shaft 176 and the support means 183. The support means 83 includes a bearing member 184 supported on the base 30 by a support tube 186. The lower disc 162 rests on the bearing 184 and is restrained from axial movement toward the base 30 thereby. The support tube 186 is secured to the base 30 by means of the fasteners assemblies 188. A bearing 194 is provided in the base 30 through which the drive shaft 176 passes and is rotatably supported thereby. As can be seen from the above, the bearing members 184, 194 rotatably support the drive shaft 176 so that the feeder wheel 100 is rotatably mounted on the base 30. It should be understood that any means well known to those skilled in the art may be utilized to rotatably mount the feed wheel 100 to the base 30.

Figure 6:
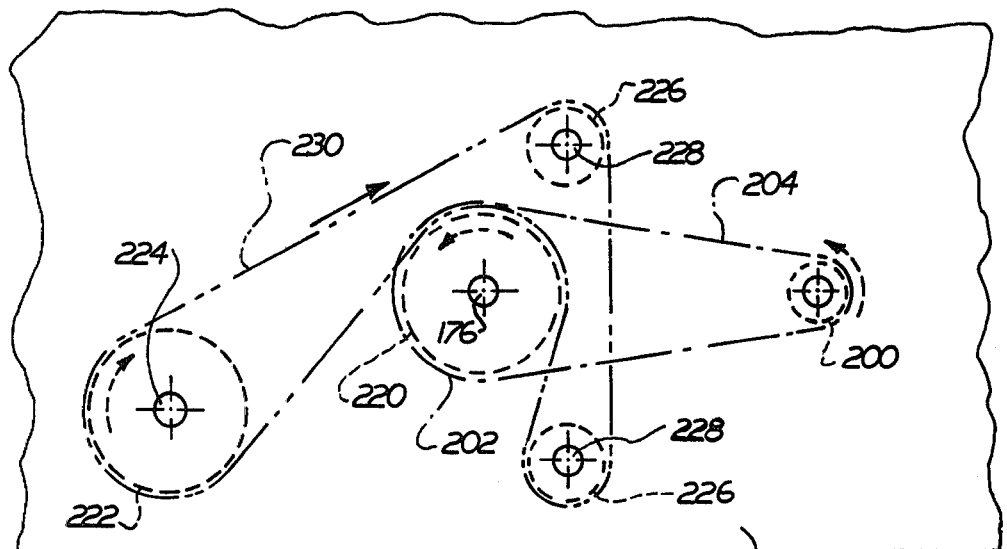
FIG. 6 is a schematic plan view of drive means of the apparatus shown in FIG. 1.

Means are provided to drive the feeder wheel 100 and the assembly wheel 32 as seen in FIG. 1. The drive means 36 includes a motor 196 connected to a gear box 198 for changing the speed of the motor 196 to a predetermined speed. The motor 196 and gear box 198 are secured to the base 30. In general, an adjustable gear box 198 is used so that the rotational speed of the feed wheel 100 and assembly wheel 32 may be adjusted. The output shaft of the gear box 198 has a drive sprocket 200 secured thereto. The drive shaft 176 has a driven sprocket 202 drivingly connected therewith, as will be hereinafter further described. A chain 204, schematically indicated in FIGS. 1, 5 and 6, is provided for drivingly connecting the sprockets 200 and 202.

A clutch mechanism 206 is provided for drivingly connecting the driven sprocket 202 to the drive shaft 176 as seen in FIG. 5. The clutch 206 is provided to minimize any damage that may occur to the machine should any unexpected forces be exerted on the feed wheel 100 or the assembly wheel 32. The clutch 206 includes a collar 208 secured to the shaft 176 by any conventional known means such as a key 210. The key 210 prohibits both axial movement of the collar 208.

along the shaft 176 or rotational movement of the collar 208 about the shaft 176. The end portion 212 of the shaft 176 is threaded for receiving a threaded fastener 214 thereon. The clutch 206 includes a friction disc 218 positioned adjacent to the driven sprocket 202 and a collar 216 positioned between the friction disc 218 and the threaded fastener 214. The driven sprocket 202 has a centrally located opening for receiving the drive shaft 176 thereon.

As can be seen from the above, when the nut 214 is tightened, the friction disc 218 and collar 208 are urged into contact with the driven sprocket 202 and an adjustable driving relationship is effected between the driven sprocket 202 and the drive shaft 176. It should be clearly understood that any clutching mechansim will known to those skilled in the art may be used.

The drive means 36 includes a drive sprocket 220 secured to the feeder drive shaft 176 by means of the key 221 as seen in FIG. 5. The drive means 36 also includes a driven sprocket 222 secured to the assembly wheel drive shaft 224 by means of the key 223. The drive shaft 224 is drivingly connected to the assembly wheel 32 in a manner as will hereinafter be more fully described. Idler sprockets 226, schematically shown in FIG. 6. are also provided and are rotatably mounted to the shafts 228 which are movably secured on the base 30. The sprockets 220, 222 and 226 are in alignment with each other and are drivingly connected by means of the chain 230, schematically shown in FIGS. 5 and 6. The chain 230 may be adjusted by movement of idler shafts 228 and consequently the idler sprockets 226 to thereby allow for changing the center distance between the drive shafts 176, 224.

Since the sprockets 220 and 222 are of the same diameter, the drive means 36 of the present invention assures that the peripheral speed of the feed wheel 100 and the assembly wheel 32 are equal, since in this case the radius R of the feed wheel is equal to the radius R of the assembly wheel. It should be understood that should for any reason the diameter of the feed wheel 100 be different from the diameter of the assembly wheel 32, that the size of the sprockets 220 and 222 may be changed so that the peripheral speeds of the feed wheel and assembly wheel, 100 and 32 respectively, are equal for the purpose hereinafter described.

It should be further understood that any drive means that provides for driving the drive shafts 176, 224 so that the peripheral speed of the feed wheel 100 and assembly wheel 32 are equal, may be utilized. For example, gears may be used to interconnect the drive shafts 176 and 224. It should also be understood that the direction of rotation of the drive shafts 176, 224 will be in opposite directions so as to insure the smooth, even transfer of the fastener from the feed wheel 100 to the assembly wheel 32 as will be hereinafter more fully described.

The feed wheel 100 is rotated by the drive shaft 176 about a substantially vertical axis 231 in a counter-clockwise direction, generally indicated by the arrow 232 in FIG. 4. For ease of description, the various positions on the wheel will be hereinafter referred to as those relative positions toward the direction of rotation of the wheel as "upstream" and those relative positions away from the direction of rotation as "downstream".

The feed wheel 100 is positioned adjacent to the track 118 and is spaced therefrom a sufficient distance to allow the free flow of fasteners from the track 118 into the pockets 158.

The pockets 158 in the feed wheel 100 are evenly spaced about the periphery thereof. The pockets 158 are sufficiently close to allow for the desired rate of assembly of the washers and fasteners. The space between the pockets also depend on the shape and size of the fasteners and washers to be assembled.

For ease of description, one such pocket 158 will be hereinafter described. It should be understood that the remainder of the pockets are formed in the same configuration so as to provide for the feeding of fasteners from the fastener track 118 into the pockets 158 without the need for intermittent motion type devices.

Figure 9:
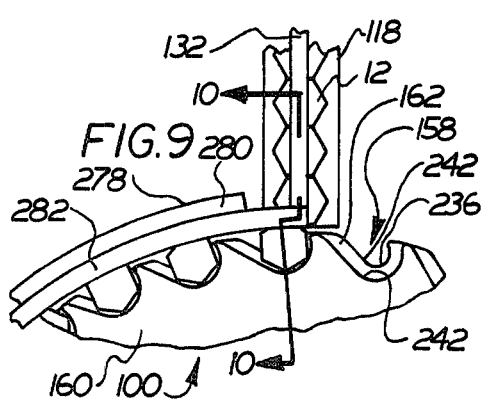
FIG. 9 is an enlarged view of a portion of the feeder wheel and fastener feeder of the apparatus shown in FIG. 2.
Figure 10:
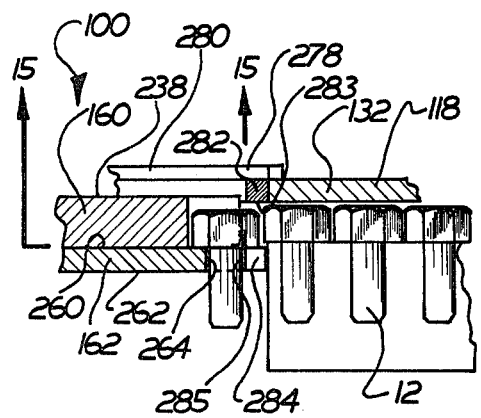
FIG. 10 is a cross-sectional view taken along line 10—10 of FIG. 9.

Each of the pockets 158 in the feed wheel 100 include a head pocket portion 234 in the upper disc 160 and a shank pocket portion 236 in the lower disc 162 as seen in FIG. 9. As seen in FIGS. 10 and 16, the head pocket portion 234 is shaped to receive a portion of the head 14 of the fastener 12 therein. The upper disc 160 has an upper surface 238 and a lower surface 240 which are perpendicular to the axis of rotation 231 of the disc 160. The head pocket portion 234 is formed by the pocket surface 242 which extends between the upper and lower surfaces 238, 240 of the upper disc 160. The pocket surface 242 includes a lead in surface portion 246 extending in a downstream direction from the outer peripheral surface 248 of the upper disc 160 and at a lead angle in a downstream direction and inclined in a radially inwardly direction. Throughout the specification whenever the term lead in angle or lead in surface is used in connection with a pocket on a wheel, it is to be understood that the lead in angle is sufficiently great to allow the part to enter the pocket when the wheel is rotating at a high speed. The outer peripheral surface 248 extends about an arcuate portion having a greater radius than the radius R of the arcuate path 249 of the rotational center 250a of the fastener 12. The arcuate path 249 describes the arc having a radius R in which the center 250 of the fastener moves when it is retained on the feeder wheel 100. For ease of description, the axis of rotation of the fastener 12 will hereinafter be referred to as 250a and the central axis of rotation passing through the center of the opening 20 of the washer 18 will hereinafter be referred to as 250b. When the washer 18 and fastener 12 have their respective axes 150b and 250a in alignment with each other, the common axis will be referred to as 250.

The lead in surface portion 246 terminates in an arcuate head retaining portion 252. The arcuate head retaining portion 252 is generated by a circle extending about the center of the axis of rotation 250a of the fastener 12 when it is positioned a distance R form axis of rotation 231. The radius of the head retaining portion 252 is slightly larger than the largest portion of the head 14 and is provided to minimize "wooble" and unnecessary movement of the fastener 12 as it is received and fed by the feeder wheel 100.

A parallel outer lip portion 254 of the pocket surface 242 extends from and is contiguous with the head retaining portion 252. The outer lip portion extends radially outwardly in a direction parallel to the center line 256 between the axis of rotation 231 and the axis 250a of the fastener 12 in the pocket 158. The parallel outer lip portion 254 terminates in a radius portion 258 interconnecting the parallel outer lip portion 254 and the downstream outer peripheral surface 248.

The shank pocket portion 236 in the lower disc 162, as seen in FIG. 9, is shaped to receive a portion of the shank 16 of the fastener 12 therein. The lower disc 162 has an upper surface 260 and a lower surface 262 which are perpendicular to the axis of rotation 231 of the disc 162 as seen in FIG. 10. The shank pocket portion 236 is formed by the shank pocket surface 264 which extends between the upper and lower surfaces 260, 262 of the lower disc 162. The pocket surface 264 includes a lead in surface portion 266 extending in a downstream direction from the outer peripheral surface 268 of the lower disc 162 and at a lead in angle inclined in a radially inwardly direction as seen in FIG. 15. The outer peripheral surface 268 extends about an arcuate portion having a greater radius than the radius R of the arcuate path 249 of the rotational center 250a of the fastener 12 when mounted on the feed wheel 100. The arcuate path 249 describes the arc in which the center 250a of the fastener moves when it is retained on the feeder wheel 100.

The lead in surface portion 266 terminates in an arcuate shank retaining portion 270. The shank retaining portion 270 is generated by a circle extending about the center of axis of rotation 250a of the fastener when it is positioned a distance R from the axis of rotation 231 and received in the pocket 158. The radius of the shank retaining portion 270 is substantially the same as the outside diameter of the shank 16 providing for normal manufacturing tolerances of the fastener and is provided to retain the fastener 12 as it is received and fed by the feeder wheel 100.

The shank retaining portion 270 includes a hook portion 272 which extends about a portion of the shank radially away from the point of intersection between the arcuate path 249 and the outer surface of the shank 16. The hook portion retains the fastener 12 in the pocket 158 so as to restrain the fastener from radial movement out of the pocket. This function is of primary importance since when the pocket 158 passes the feeder track 118, a fastener is removed therefrom and begins to travel in the arcuate path 249. The hook portion 272 grips the fastener and retains the fastener in the pocket 158. Accordingly, the hook portion 272 eliminates the need for feeder bars and other intermittent motion type devices which restrict the speed at which the apparatus 10 of the present invention may be operated. The hook portion 272 terminates in a radius portion 274 which interconnects the hook portion 272 with the downstream outer peripheral surface 268.

As can be seen by the above, the surfaces 242, 264 of the pockets 158 may be formed in the discs 160, 162 by any conventional machining devices and do not require special castings or other methods of forming those surfaces and may be readily more inexpensively formed by conventional machining methods in the discs. It should be understood that the radius R may be determined dependent on the particular shape of the fastener so that the desired number of fasteners may be fed by the feeder wheel 100.

The pockets 158 of the feeder wheel 100 are capable of receiving fasteners supplied by the track 118 without the use of any feeder bars or other intermittent motion type devices. The outlet end of the track 118 is positioned so as to provide fasteners 12 having their axes 250a parallel to the axis of rotation 231 of the feeder wheel 100. The outer peripheral surfaces 248, 268 of the feeder wheel 100 are co-extensive with each other and provide a smooth, even surface between the pockets 158. The feeder wheel 100 is positioned a sufficient distance away from the outlet end of the track 118 so as to allow the fasteners to be removed therefrom.

As the feeder wheel 100 rotates, the fasteners 12 are urged toward the feeder wheel by the other fasteners in the track 118. As seen in FIG. 9, the head pocket surface 242 is spaced from the shank pocket surface 264 a sufficient distance to allow the shank of the fastener to contact the lead in surface 266. As the feeder wheel 100 continues to rotate in the direction 232, the fastener continues to slide down the lead in surface portions 246, 266 in a downstream direction and toward the feeder wheel 100 shown in FIGS. 15 and 16. When the shank 16 is in contact with the shank retaining portion 270, the hook 272 retains the fastener in the pocket 158 and the fastener begins to move in its arcuate path of travel 249.

As shown in FIGS. 2 and 4, an air nozzle 276 is provided to supply a stream of pressurized air against the fasteners fed from the track 118 and toward the direction of rotation of the feeder wheel 100. This pressurized air assists in the feeding of fasteners into the feeder wheel 100. The nozzle 276 is connected to the manifold 96 to supply pressurized air to the nozzle 276 so that the fastener 12 is urged in the direction of rotation of the feeder wheel 100.

A fastener retainer and guide assembly 278 is provided as seen in FIG. 4 for retaining and guiding the fasteners 12 as they move through their arcuate path 249 in the direction 232 on the feeder wheel 100. The fastener retainer and guide assembly 278 is generally arcuate in configuration. The fastener retainer and guide assembly 278 extends arcuately about the feeder wheel 100 from the track 118 in the direction of rotation 232 to the assembly wheel 32. The fastener retainer and guide assembly 278 includes an outer peripheral member 280, an upper head retaining member 282 and a shank retaining member 284 as particularly seen in FIGS. 4, 9 and 10. The outer peripheral member 280 of the fastener retainer member and guide assembly 278 has an outer peripheral surface 281 adjacent to the feeder wheel 100 and adjacent to the head of the fastener to restrict movement of the fastener 12 from the pocket 158 as it moves in its arcuate path 249. The arcuate outer peripheral surface 281 extends in a vertical direction from a position adjacent to the upper surface 238 of the wheel 100 to a position adjacent to the lower surface 262 thereof.

The lower retaining surface 283 of the upper head retaining member is positioned adjacent to the head of the fastener so as to restrain the fastener from axial movement as it is moved by the wheel 100. The inner peripheral surface 285 of the shank retaining member 284 is positioned adjacent to the shank of the fastener when the fastener is retained in the feeder wheel 100. The inner peripheral surface 285 restricts movement of the fastener out of the pocket 158 in the feeder wheel 100 when it is rotated thereby.

As can be seen from the above, the fastener retainer and guide assembly 278 retains the fasteners 12 in the pockets 158 when the fasteners are advanced by the wheel 100. The fastener retainer and guide assembly 278 is adjustably supported on the base 30 by means of the supports 286. The supports 286 have slots 290 therein for receiving fasteners 288 therethrough. The fasteners threadedly engage the base 30 and provide for adjustment of the supports 286 as will be hereinafter more fully described.

The washers and fasteners 18, 12 are fed into the pockets 34 on the assembly wheel 32 and upon rotation of the assembly wheel 32 are assembled. As seen in FIG. 5, the assembly wheel 32 includes a fastener head disc 292, a shank disc 294, spacer disc 296, washer disc 298, support disc 300 and collar 302. The discs 292, 294, 296, 298 and 300 are secured together by any conventional means such as the threaded fastener assemblies 304. The threaded fastener assemblies 304 include the bolts 306 and the nuts 308. The bolts 306 are received in aligned openings through the discs 292, 294, 298 and 300. The nuts 308 cooperate with the bolts 306 to secure the discs 292, 294, 298 and 300 in a unitary assembly.

Each of the discs 292, 294, 296, 298 and 300 have an aligned central opening 310 therethrough for receiving the drive shaft 224 therethrough. The collar 302 is adjustably secured to the fastener head disc 292 by the bolts 312. The bolts 312 pass through the slots 314 in the collar 302 as seen in FIGS. 4 and 5 and are threadedly engaged by the threaded openings 316 in the fastener head disc 292.

To drivingly connect the assembly wheel 32 to the drive shaft 224, the drive shaft 224 has a keyway 318 for receiving a portion of the key 320 therein. A keyway 322 is provided in the collar 302 for receiving a portion of the key 320 therein. Accordingly, a driving connection is effected between the assembly wheel 32 and the drive shaft 224.

It should be understood that other means may be utilized to effect a driving relationship between the assembly wheel 32 and the drive shaft 224 while providing for angular adjustment of the assembly wheel 32 and the shaft 224 as will be hereinafter more fully described.

The assembly wheel 32 is rotatably supported on the base 30 by the drive shaft 224 and the support means 323. The support means 323 is similar in construction to the support means 183 and includes a bearing member 324. The support disc 300 of the assembly wheel 32 bears against and is supported in a vertical direction by the bearing 324. The bearing member 324 is supported on the base 30 by the support tube 326. The support tube 326 is secured to the base 30 by means of the fastener assemblies 328. A bearing 327 is provided in the base 30 to support the shaft 224.

It should be understood that any means known to those skilled in the art may be utilized to rotatably mount the feeder wheel 100 and the assembly wheel 32 to the base 30. It should be further understood that such mounting means allows for adjusting the distance between the center line 330 of the shaft 224 toward and away from the center line 231 of the shaft 176. One such means is the mounting of the bearing 327 and fastener assemblies 328 in slots 329 in the base 30, which slots are positioned so that the center line 330 of the shaft 224 may be moved toward and away from the center line 231 of the drive shaft 176. When the drive shaft 224 is so adjusted, the idler sprockets 226 are adjusted so that the chain 230 connecting the sprockets 220, 222 which drivingly engage the shafts 176, 224 respectively, is correspondingly adjusted. Such adjustment of the distance between the center lines 231, 330 allows for the adjustment of the distance between the feed wheel 100 and the assembly wheel 32 as will be hereinafter more fully described.

It should be understood though that the wheels 32, 100 are rotated in opposite directions to effectuate the transfer of the fasteners therebetween. The assembly wheel 32 is rotated about the axis 330 in a generally clockwise direction as generally indicated by the arrow 332 in FIG. 4. It should be understood that it is within the contemplation of this invention that the assembly wheel 32 and feeder wheel 100 may be rotated in opposite directions 232 and 332, respectively, as herein described. The components of the apparatus 10 may be rearranged to accommodate such opposite directions of rotation.

The assembly wheel 32 is positioned adjacent to the track 58 and is spaced a sufficient distance therefrom to allow the free flow of washers 18 from the track 58 into the pockets 34. The pockets 34 on the assembly wheel 32 are evenly spaced about the periphery thereof. For ease of description, only one such pocket will be hereinafter described but it should be understood that the remainder of the pockets are formed in the same configuration.

Figure 13:
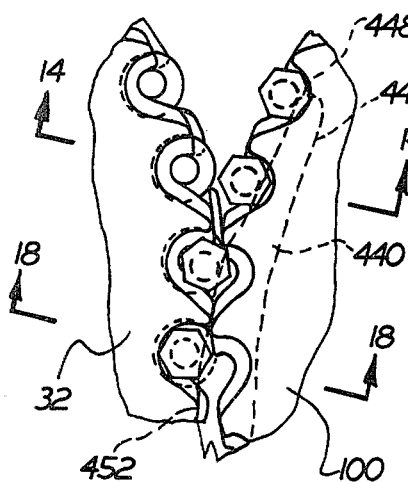
FIG. 13 is an enlarged fragmentary elevational view of a portion of the feeder and assembly wheels shown in FIG. 2.
Figure 14:
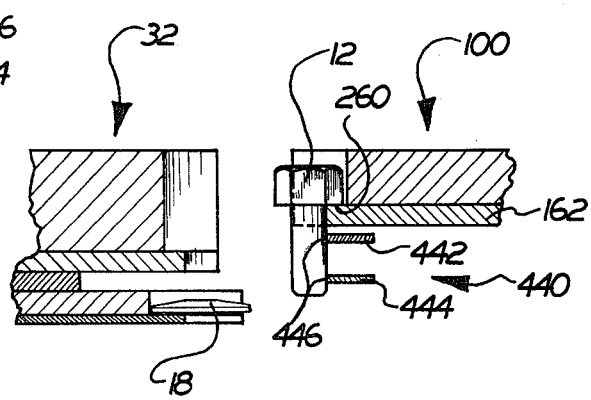
FIG. 14 is a sectional view of the apparatus shown in FIG. 13 and taken along line 14—14 thereof.
Figure 17A:
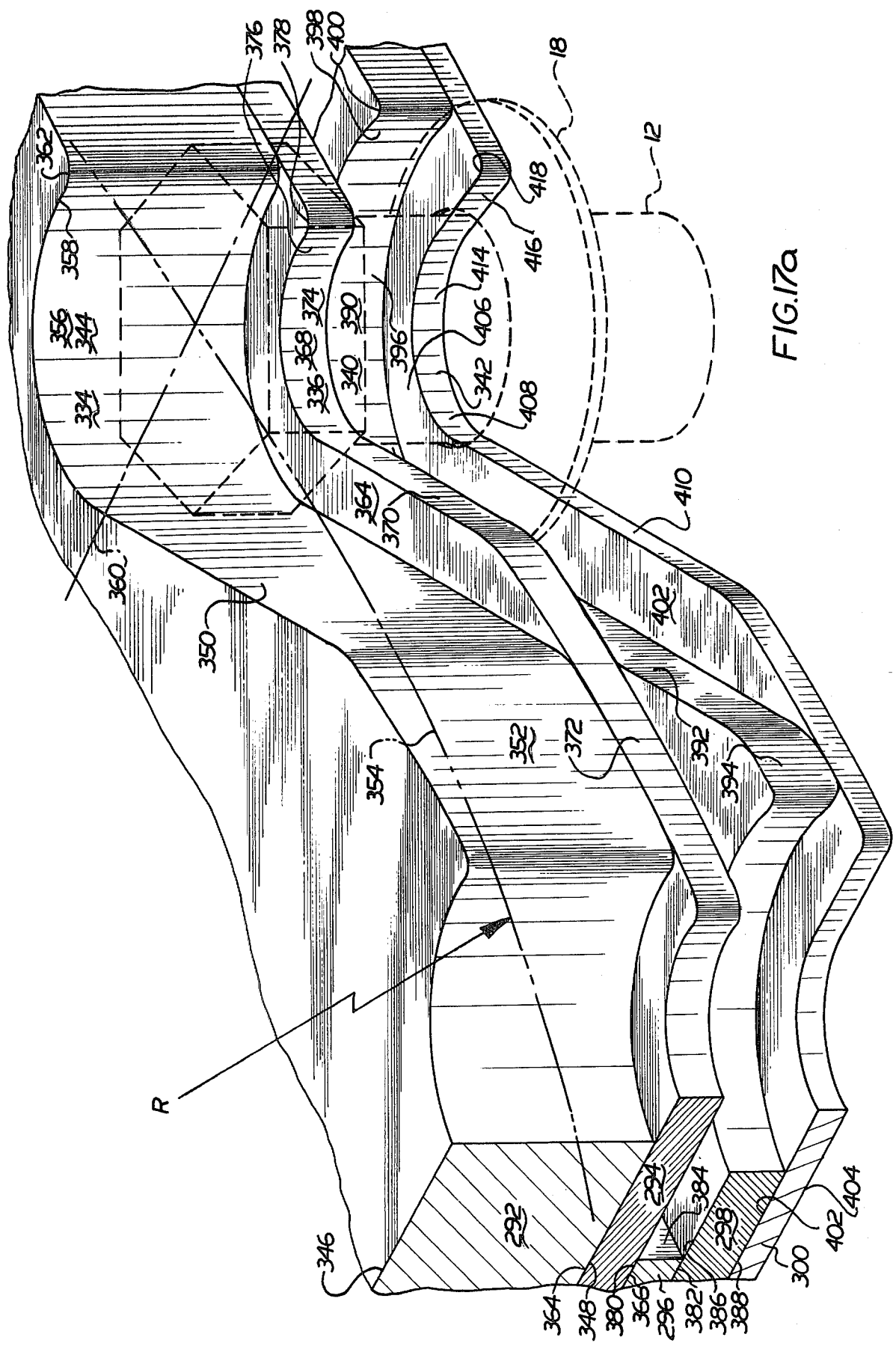
FIG. 17a is a fragmentary perspective view of the pockets of the assembly wheel shown in FIG. 4.

Each of the pockets 34 in the assembly wheel 32 include pocket portions 334, 336, 340 and 342 in the discs 292, 294, 298 and 300 respectively. It should be understood that the pocket portions 334 and 336 are formed in a manner as described above in connection with the pocket portions 234, 236 respectively, of the feed wheel 100. As seen in FIGS. 13, 14 and 17a, the head pocket portion 334 is shaped to receive a portion of the head 14 of the fastener 12 therein. The head pocket portion 334 is formed by the pocket surface 344 which extends between the upper and lower surfaces 346, 348 of the disc 292. The pocket surface 344 includes a lead in surface portion 350 extending at a lead in angle in a downstream direction from the outer peripheral surface 352 of the fastener head disc 292 and inclined in a radially inwardly direction. The outer peripheral surface 352 may extend about an arcuate portion having a radius that is less than the radius R of the arcuate path 354 of the rotational center of the fastener 12 and washer 18 if it is desirable to position the feeder wheel 100 over the assembly wheel 32 as will be further described. The arcuate path 354 describes the arc in which the center lines 250b and 250a respectively, of the washers and fasteners move when the fasteners and washers are retained on the assembly wheel 32.

The lead in surface portion 350 terminates in an arcuate head retaining portion 356 which is generated by a circle extending about the center of axis of rotation of the fastener 250a when it is positioned a distance R from the axis of rotation 330. The radius of the head retaining portion 356 is slightly larger than the largest portion of the head 14 and is provided to minimize unnecessary movement of the fastener 12 as it is received and assembled by the assembly wheel 32.

The arcuate surface 344 includes a parallel outer lip portion 358 extending from and contiguous with the head retaining portion 356 and extends towards the arc of travel 354. The outer lip portion 358 extends in a direction parallel to the center line between the axis of rotation 330 and the axis 250 of the fastener 12 and the pocket 34. The parallel outer lip portion 358 terminates in a radius portion 362 interconnecting the parallel outer lip portion 358 and the downstream outer peripheral surface 352.

The shank pocket portion 336 is formed in a manner similar to that described in connection with the shank pocket portion 236 of the feed wheel 100. The shank pocket portion 336 is formed in the shank disc 294 and is shaped to receive a portion of the shank 16 of the fastener therein. The shank disc 294 has an upper surface 364 and a lower surface 366 which are perpendicular to the axis 330 of the disc 294. The shank pocket portion 336 is formed by the shank pocket surface 368 which extends between the upper and lower surfaces 364, 366 of the disc 294.

The pocket surface 368 includes a lead in surface portion 370 extending in a downstream direction from the outer peripheral surface 372 of the disc 294 and inclined at a lead in angle in a radially inwardly direction. It should be understood that the lead in portion 370 begins after and is spaced from the lead in portion 350 of the disc 292 so as to accommodate both the shank and the head of the fastener 12 in the pocket portions 334, 336 as will hereinafter be more fully described. The outer peripheral surface 372 extends about an arcuate portion having a greater radius than the radius of the arcuate path 354 of the rotational center 250a of the fastener 12 mounted on the assembly wheel 32 and is of the same radius as the outer peripheral surface 352 of the disc 292.

The lead in surface portion 370 of the pocket surface 368 terminates in a downstream section and an arcuate shank retaining portion 374. The shank retaining portion 374 is generated by a circular arc having a radius which is substantially the same as the outside radius of the shank 16 of the fastener 12 within normal manufacturing tolerances and is provided to retain the fastener 12 as it is received and assembled by the assembly wheel 32. The shank retaining portion 374 includes a hook portion 376 which extends circumferentially about a portion of the shank radially away from the point of intersection between the arcuate path 354 and the outer surface of the shank 16 as shown in FIG. 17a. It should be understood that FIG. 17a is a perspective view provided only for purposes of illustrating the present invention. The hook portion 376 terminates in a radius portion 378 which interconnects the surface of the hook portion 376 with the downstream outer peripheral surface 372.

The hook portion 376 operates to retain the fastener in the pocket 34 during assembly thereof with the washer so as to restrain radial movement of the fastener out of the pocket 34. This function is of substantial importance since when the pocket 34 passes the pocket 158 on the feeder wheel, the fastener is removed from the feeder wheel 100 and passes to the assembly wheel 32 so that the arcuate path of the fastener is changed. The hook portion 376 grasps the shank of the fastener and accordingly eliminates the need for intermittent type devices to assist in the transfer of the fastener which impede the speed at which the apparatus 10 of the present invention may be operated.

The spacer disc 296 has an upper and a lower surface 380, 382 respectively. The disc 296 has an outer peripheral surface 384 extending between the upper and lower surfaces 380, 382 and is positioned a distance sufficiently inwardly away from the arc of travel 354 so as to not interfere with the washer or the fastener 12, 18 respectively. The spacer disc 296 provides for a space between the fastener and washer 12, 18 when the fastener is fed into the pockets 34 and before it is assembled with the washer and allows a transfer cam to be utilized as will be further described. The transfer cam allows the fastener to be transferred from the wheel 100 to the wheel 32 by grasping the shank of the fastener with the pocket portion 336 so that a portion of the shank is below the pocket portion 336 and minimizes canting and tipping of the fastener as it is transferred from the feeder wheel 100 to the assembly wheel 32. It should be understood that the distance between the upper and lower surfaces 380, 382 of the spacer disc may be varied dependent upon the type of fastener to be assembled.

The washer retaining pocket portion 340 in the washer disc 298 is shaped to receive the washer 18 therein as seen in FIGS. 17 and 17a. The washer disc 298 includes an upper surface 386 and a lower surface 388 which are perpendicular to the axis 330 of the rotation of the disc 298. The washer pocket portion 340 is formed by the washer pocket surface 390 which extends between the upper and lower surfaces 386, 388 of the washer disc 298. The washer pocket surface 390 includes a lead in surface portion 392 extending in a downstream direction from the outer peripheral surface 394 of the washer disc 298 and inclined at a lead in angle in a radially inwardly direction. The outer peripheral surface 394 extends about an arcuate portion having a greater radius than the radius R of the arcuate path 354 of travel of the rotational center 250b of the washer 18 when mounted on the assembly wheel 32. It should be understood that the arc generating the arcuate peripheral surface 394 is greater than the arc generating the outer peripheral surfaces 352, 372 of the disc 292, 294. The arcuate path 354 describes the arc in which the center 250 of the fasteners and washers move when they are retained on the assembly wheel 32.

The lead in surface portion 392 terminates in an arcuate washer retaining portion 396. The arcuate washer retaining portion 396 is generated by a circle extending about the center of axis of rotation 250b of the washer when its center is positioned a distance R from the axis of rotation 330. The radius of the washer retaining portion 396 is substantially the same as the outside diameter of the washer within normal manufacturing tolerances and is provided to retain the washer 18 as it is received and assembled by the assembly wheel 32.

The washer retaining portion 296 includes a hook portion 398 which extends circumferentially about a portion of the outer periphery of the washer and radially away from the point of intersection between the outer peripheral surface of the washer and the arcuate path 249. The hook portion 398 retains the washer 18 in the pocket portion 340 so as to restrain the washer from radial movement out of the pocket. The hook portion 398 terminates in a radius portion 400 which interconnects the hook portion 398 with the downstream outer peripheral surface 394. Since the washer 18 has the largest outer diameter it is desirable to minimize the length of the outer peripheral surface 394, even to a portion of the outside of the radius portion 400 to maximize the number of washer/fastener assembly pockets 34 on the wheel 32. The function of the hook portion 398 is of substantial importance since when the pocket portion 340 passes the feeder track 58, the washer is removed therefrom and begins to travel in the arcuate path 354. The hook portion 398 accordingly eliminates the need for feeder bars and other intermittent motion type devices which impede the speed at which the apparatus 10 of the present invention may be operated.

The pocket portion of the support disc 300 is shaped to support the washer 18 thereon and retain the portion of the shank of the fastener as it is assembled with the washer. The support disc 300 has an upper surface 402 and a lower surface 404 each of which are perpendicular to the axis of rotation 330 of the disc 300. The support pocket portion 342 is formed by a washer pocket surface 406 and a shank pocket surface 408.

The washer pocket surface 406 includes a portion of the upper surface 402 as defined by the pocket surface 390 of the washer disc 248 and the shank retaining portion 408 of the disc 300. The shank retaining surface 408 extends between the upper surface and lower surface 402, 404 respectively of the support disc 300. The shank retaining surface 408 includes a lead in surface portion 410 extending in a downstream direction from the outer peripheral surface 412 of the disc 300 and inclined at a lead in angle in a radially inwardly direction. The outer peripheral surface 412 extends about an arc having a greater radius than the radius R of the arcuate path 354 and greater than the arcuate path of the outer peripheral surfaces 352, 372 of the discs 292, 294 and is generally co-extensive with the outer peripheral surface 394 of the washer disc 398. The lead in surface 410 extends from the lead in surface 392 a distance substantially equal to the flange width of the fastener or one-half of the diameter of the washer 18 less the diameter of the opening 20. It should be understood that the entire shank retaining surface 408 is spaced from the pocket surface 390 of the washer disc by a distance substantially equal to the flange width of the fastener.

The lead in surface portion 410 terminates in the downstream direction in an arcuate shank retaining portion 414. The shank retaining portion 414 is generated by a circle extending about the center of the axis of rotation 250a of the fastener 12 when it is positioned a distance R from the axis of rotation 330 and received in the pocket 34. The radius of the shank retaining portion 414 is substantially the same as the outside diameter of the shank 16 within normal manufacturing tolerances and is provided to retain the fastener 12 as it is assembled by the assembly wheel 32.

The shank retaining portion 414 includes a hook portion 416 which extends circumferentially about a portion of the shank 16 of the fastener 12 and radially away from the point of intersection between the arcuate path 249 and the outer surface of the shank 16. The hook portion 416 retains the fastener 12 in the pocket 34 so as to restrain the fastener from radial movement out of the pocket by such forces such as centrifugal force. This pocket is of substantial importance particularly if the fastener is transferred from the assembly wheel 32 to another assembly wheel which provides for further movement of the assembly of the washer and fastener together.

The hook portion 416 terminates in a radius portion 418 which connects the hook portion 416 with the downstream outer peripheral surface 412. It should be understood that the shank retaining surface 408 is a shape similar to the shape of the shank retaining surface 368 and provides for the uniform removal of the washer/fastener assembly from the assembly wheel 32.

Figure 11:
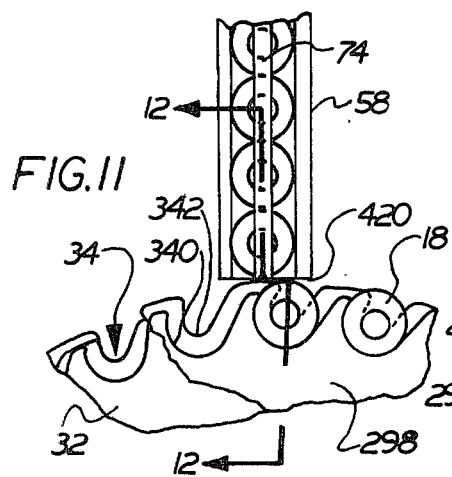
FIG. 11 is an enlarged fragmentary plan view of a portion of the assembly wheel and washer feeder shown in FIG. 2.
Figure 12:
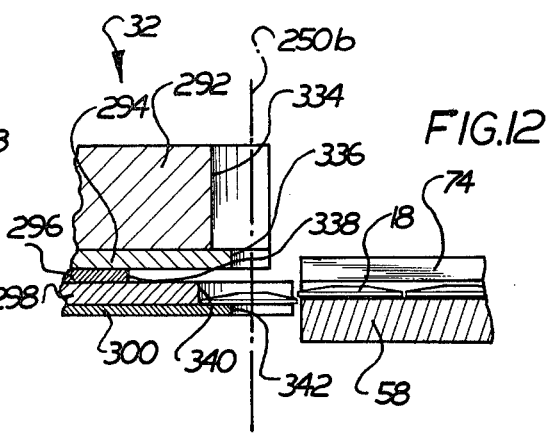
FIG. 12 is a cross-sectional view of FIG. 11 and taken along line 12—12 thereof.

The pockets 34 on the assembly wheel 32 are capable of receiving washers in the pocket portions 340, 342 when supplied by the track 58 as seen in FIGS. 11 and 12. The present invention provides a feeding mechanism whereby the washers are fed into the assembly wheel 32 which does not require the use of any feeder bars or other intermittent motion type devices. As previously described, the washers 18 are present in the track 58 under the gravitational force of the other washers in the track and are thereby urged toward the assembly wheel 32. The outlet end 420 of the track 58 is in close proximity to the outer peripheral surfaces 394, 412 of the assembly wheel 32. Preferably, the outer peripheral surfaces 394, 412 are in sliding contact with the head 420 of the track 58 and if necessary, the assembly wheel 32 may be spaced a small clearance distance therefrom. It should be understood that the track 58 is in alignment with the rotational center 330 of the assembly wheel 32. It should also be understood that the fastener feeder track 118 is in alignment with the axis 231 of the feeder wheel 100.

The washer to be fed slides radially toward the axis 330 and down the lead in surface 392 towards the axis of rotation 330 and into the pocket 34. Such radial movement of the washer continues until the retaining portion 396 and hook portion 398 of the assembly wheel contact and capture the fastener in the pocket 34. The washer pocket surface 406 is positioned slightly a clearance distance below the washer support surface 62 of the bottom member 60 so as to avoid jamming of the washers and provides for some slight dropping of the washer. The thickness of the washer disc 298 is sufficient to provide a pocket surface 390 of sufficient depth to accommodate such movement of the washer.

When the washer is received in the pocket 34, it is also supported by the washer pocket surface 406 of the assembly wheel 32. As the assembly wheel 32 continues to rotate, the outer peripheral edge of the washer in the pocket 34 slides against and away from the next adjacent washer in the track 58 and begins its travel in a rotary path having its axis 250b moving along the arcuate path 354 of the assembly wheel 32. The next washer to be fed comes into contact with the outer peripheral surface 394 or the radius portion 400 of the assembly wheel 32 until it reaches the next lead in surface 392 of the next pocket 34.

A pressurized air nozzle 422 is provided and is connected to the manifold 96 and consequently to the source of pressurized air 94. The pressurized air provided by the nozzle 422 urges the washer to be fed in a direction toward the assembly wheel 32 and into the pocket 34 and assists in the feeding operation while minimizing any jamming or misfeeding of the washers as they are fed into the pockets 34.

After the washer is received in the pocket 34, it moves in an arcuate path 354 to a point where the assembly wheel 32 is adjacent to the feeder wheel 100. A retainer and guide assembly 424 is provided to retain the washers in the pockets 34 and restrict any movement of the washer due to centrifugal force as they move in their arcuate path as seen in FIG. 4. The washer retainer and guide assembly 424 includes an outer peripheral member 426 having an inner peripheral surface 428. The inner peripheral surface 428 is circular in configuration and is positioned and extends adjacent to the outer peripheral surfaces 394, 412 of the assembly wheel 32. As the washers are rotated by the assembly wheel 32, the inner peripheral surface 428 is adjacent to the outer peripheral surface of the washers to retain the washer therein. The outer peripheral member 426 is supported by the supports 430 on the base 30 and is radially adjustable with respect to the assembly wheel 32. The supports 430 are of a construction as will hereinafter be described and are secured to the base 30 by means of the fasteners 432 which pass through slots 434 in the support base. The slots 434 are positioned so that the guide assembly 424 can move radially toward and away from the axis of rotation of the assembly wheel 32. This adjustment is provided for the control of any movement of the washers in the pockets 34.

As the feeder wheel 100 and the assembly wheel 32 rotate in their respective directions 232, 332 the washers and fasteners move toward a transfer area 436. The transfer area 436 is that area where the wheels 100, 32 are adjacent to each other and the fastener 12 is transferred from the feeder wheel 100 to the assembly wheel 32.

As hereinabove stated, the peripheral speed of the fastener 12 moving along the arcuate path 249 is equal to the peripheral speed of the washer 18 as it moves about its peripheral path 354 when received in the pockets 34 on the assembly wheel 32. By providing for equal peripheral speeds, the transfer of the fastener from the feeder wheel 100 to the assembly wheel 32 is accomplished in an uninterrupted, smooth fashion. It should be understood that the radius R of both the assembly wheel 32 and the feeder wheel 100 may be changed relative to each other and the speed of rotation of the wheels 32, 100 will be varied accordingly so as to provide equal peripheral speeds along the paths 354, 249 respectively. It should also be understood that if the speed of rotation of one of the wheels 32, 100 is greater than the other wheel, the radiuses of the wheels 32, 100 may be changed so that the peripheral speeds along the arcuate paths 354, 249 are equal.

The transfer of the fastener from the feeder wheel 100 to the assembly wheel 32 is accomplished by the use of a transfer device cam 440 as will be hereinafter more fully described. The cam members 442, 444 of the transfer cam 440 include identical cam surfaces 446 thereon. To minimize jamming of the fasteners in the feed wheel 100, the cam members are positioned below the feed wheel 100 and adjacent to the bottom of the lower disc 162 as seen in FIGS. 14 and 18.

The cam surfaces 446 smoothly come into contact with the shank of the fastener as it is retained on the feeder wheel 100 and smoothly transfers the fastener from the pockets 158 in the feeder wheel to the pockets 34 on the assembly wheel 32. When the fasteners on the feeder wheel 100 reach the transfer area 436, the transfer cam surfaces 446 on the members 442, 444 come into contact with the shank of the fastener, as generally seen in FIGS. 13 and 14. The transfer cam surfaces 446 come into contact with the shank of the fastener on the feeder wheel 100 and remain in contact with the shank so as to provide a smooth, even transfer of the fastener from the feeder wheel 100 to the assembly wheel 32. As the feeder wheel 100 continues to rotate, the transfer cam surface 450 urges the fastener out of the pocket 158 in the feeder wheel 100 and towards the assembly wheel 32. The transfer cam surface 440 moves the shank of the fastener out of the hook portion 272 and about the radius portion 274 of the pocket 158 as the fastener moves toward the assembly wheel 32.

When the center line 250a of the fastener 12 reaches a center line between the axes 231, 330 the relative vertical position of the feeder wheel 100 and the assembly wheel 32 is such that the fastener 12 may be transferred from the feeder wheel 100 to the assembly wheel 32 without contacting the washer 18 in the assembly wheel 32. As seen in FIGS. 14 and 18, the upper surface 260 of the lower disc 162 retaining the fastener thereon and the washer pocket surface 406 of the support disc 300 are relatively vertically positioned so that the bottom of the shank of the fastener 12 does not contact the washer 18 retained in the pocket 34 upon transfer thereof. The shank disc 294 is vertically positioned adjacent to a central portion of the fastener 12 upon transfer thereof.

The relative vertical position of the feeder wheel 100 and the assembly wheel 32 is particularly important when the center line 250a of the fastener 12 reaches a center line between the axes 231, 330. It is desirable that arcs of travel 249, 354 are tangent so that the fastener may be transferred from the feeder wheel 100 to the assembly wheel 32 in a smooth, even manner. To so axially position the feeder wheel 100 and assembly wheel 32, the outer peripheral surface 352 of the assembly wheel 32 is generated about the axis 330 about a radius less than R so as to not interfere with the hook portion 272 of the feeder wheel 100. The relative vertical positioning of the feeder wheel 100 and the assembly wheel 32 so provide for the transfer of the fastener from the hook portion 272 on the feeder wheel 100 to the hook portion 376 of the assembly wheel 32 while the arcs of travel are tangent. Accordingly, an outer portion of the disc 172 of the feeder wheel 100 is positioned above and adjacent to an outer portion of the disc 294 and the fastener is transferred therebetween.

It is recognized that the relative positions of the assembly wheel 32 and the feeder wheel 100 will vary dependent on the configuration of the particular part. It is a desirable feature of this invention that the assembly wheel 32 hook a fastener into its pocket 34 and that the feeder wheel 100 hook a fastener into its pocket 158 and feed the fastener to the assembly wheel 32 where the fastener is hooked from the feeder wheel by the pocket 34 of the assembly wheel. It is desirable that any radial or axial movement of the fastener be minimized so that the transfer can be effectuated at a high rate of speed.

It is also imporatant to understand the relative angular position of the pockets 158 and 34 upon transfer of the fastener therebetween. It is preferable that the pockets 158 be in a timed relationship with respect to the pockets 34 on the assembly wheel and slightly in advance thereof. Means are provided to adjust the timing between the pockets 158 in the feeder wheel 100 and the pockets 34 in the assembly wheel. This adjusting means includes the bolts 312 and arcuate slots 314 in the collar 302 seen in FIGS. 4 and 5. The collar 302 is secured to the shaft 244 by loosening the bolts 312. The angular position of the assembly wheel 32 may be adjusted with respect to the drive shaft 224 and consequently with respect to the feeder wheel 100. When bolts 312 are loosened, the assembly wheel 32 may be angularly adjusted and upon tightening the bolts 312 the assembly wheel 32 is drivingly connected and secured to the drive shaft 224. Such adjustment is necessary when the speed of the assembling machine 10 is changed.

By positioning the pockets 158 of the feeder wheel 100 slightly in advance of the pockets 34, the transfer cam members 442, 444 may transfer the fastener from the pockets 158 in the feeder wheel 100 to the lead in surface 370 of the assembly wheel 32. The transfer cam members 442, 444 allow the fastener to move downstream on the lead in surface 370 of the assembly wheel 32 until the fasteners are seated in the retaining portions 356, 374. Such a smooth, even transfer minimizes the effect of the change in the inertial forces on the fasteners and the smooth, even transfer of the fasteners from the feeder wheel 100 to the assembly wheel 32 to be effected to high rates of speed.

When the transfer of the fastener is thereby completed as seen in FIG. 18, the axis 250a of the fastener 12 is in axial alignment with the axis 250b along the axis 250 previously described so as to place the washers 18 and the fasteners 12 in alignment with each other upon transfer of the fastener to the assembly wheel 32.

The surface 446 of the transfer cam 440 has a release surface 452 which moves away from contact with the shank of the fastener as the fastener begins its arcuate path of travel on the wheel 32. The transfer cam 440 is adjustably secured to the base 30 by a support 454 which is secured to the cam members 442, 444. The support is adjustably secured to the base 30 by means of the fasteners 456 passing through slots 458 in the support 454. The slots allow for adjustment of the cam members 442, 444 with respect the wheels 100, 32.

After the fasteners and washers are retained in the pockets 34 in the assembly wheel 32, and move past the transfer area 436, the relative telescopic movement of the fasteners and washers is controlled by the stationary arcuate cam 26 positioned about a portion of the periphery of the assembly wheel 32 as seen in FIG. 4. The telescopic movement of the fasteners and washers is controlled by the cam 26 until they reach the discharge area 461 and are removed from the assembly wheel 32. The stationary arcuate cam 26 is secured to the base 30 by means of the supports 462 which allow for adjustable movement in both the axial and radial direction with respect to the assembly wheel 32 as will be hereinafter more fully described.

The stationary arcuate cam 26 includes an arcuate cam surface 28 as schematically shown in FIG. 3 on an arcuate cam portion 466. The arcuate cam surface 28 has a generally helical shape and provides for moving a plurality of the fasteners along a helical path as the assembly wheel 32 is rotated to thereby effect simultaneous relative movement between a plurality of the fasteners and the washers. Accordingly, the telescopic assembled relationship between the shank portions of the fasteners and the washers is increased.

The arcuate cam 26 also includes a base 468 having an inner peripheral surface 470 extending between an upper surface 472 and a lower surface 474. The inner peripheral surface 470 has a cylindrical shape generated about a radius substantially equal to the radius of the arcuate path of travel 354 plus the radius of the outer peripheral surface of the washer 18. The cam 26 is positioned so that the inner peripheral surface 470 is adjacent to the washer 18 as it moves about its path of travel 354 adjacent to the cam so that the inner peripheral surface 470 maintains the washer 18 in the pocket 34. Accordingly, the washer travels in a generally circular path during its assembly with the fastener.

The arcuate cam portion 466 of the cam 26 has the arcuate cam surface 28 thereon. The arcuate cam surface 28 has a generally helical configuration at a predetermined helix angle H. THe helix angle H is the constant angle between a tangent to a helix and a generator of the cylinder upon which the helix lies. The axis of the helical cam surface 28 is the axis of rotation 330 of the assembly wheel 32. The helical cam surface 28 is generated a sufficient distance to a helical line 28a radially outwardly of the path of travel 354 of the fastener so that the head of the fastener may move along the cam 26 in a helical direction without interference therewith. Accordingly, the helical cam surface has an outer portion which is generated a distance greater than the radius R plus the radius of the largest portion of the head of the fastener about its axis 250.

The helical cam surface 28 extends radially inwardly towards the head of the fastener to a helical line 28b which is a sufficient distance so as to properly transmit forces to the fastener and move the fastener in a helical direction and terminate in an inner peripheral surface 464. The particular distance at which the helical cam surface 28 extends inwardly is dependent on the amount of force necessary to be transmitted to assemble the washer and fastener. In the cases of a sliding fit assembly, substantial forces are not necessary and accordingly, the helical cam surface 28 does not transmit substantial forces. Accordingly, in a sliding fit type washer/fastener assembly, the helical cam surface need not extend over the center 250 of the fastener. As will be hereinafter described, in an interference fit type washer/fastener assembly, it is desirable to extend the helical cam surface inwardly over the center line 250 of the fastener to transmit the necessary assembly forces to the fastener and to avoid canting and other undesirable twisting forces on the fastener as it is driven into the washer.

The arcuate cam portion 466 may be a separate member or may be formed integral with the base 468. In instances where the arcuate cam portion 466 is a separate member having an outer peripheral surface 465, the cam portion 466 is secured to the base 468 with the surface 465 adjacent to the base by any conventional means such as spot welding or threaded fasteners. Accordingly, the helical cam surfaces 28 extends radially outwardly to a helical line 28a past the largest portion of the head of the fastener from a helical line 28b inwardly of the head of the fastener a sufficient distance to transmit forces thereto.

It is important to understand the relationship between the speed of the wheel, the distance through which the fastener is moved to an assembled relationship, the diameter of the wheel and the helix angle H. The helix angle is dependent on a variety of factors and partially describes the rate at which the fasteners and washers may be assembled. It has been found that at high rates of speed in the assembly of washers and fasteners of the sliding fit type, the helix angle H should not exceed 35°. In a sliding fit type assembly, the gravitational forces on the fastener allows for a higher rate of assembly and the frictional and inertial forces resisting the assembly of the fastener and the washer are small so long as alignment is maintained between the parts.

In interference fit type washer/fastener assembly, a helix angle H of 15° should not be exceded since the frictional forces resisting assembly are substantial. Of course, the helix angle H is dependent on the amount of the interference fit and the forces necessary to urge the fastener and washer into an assembled relationship.

The helix angle H also is dependent on the speed of the parts that move along the helical cam surface 28. The speed that the parts move along the helical surface 28 is dependent on both the rotational speed of the wheel and the diameter of the assembly wheel 32. When the diameter of the wheel 32 is increased and the rotational speed of the wheel is maintained, a greater peripheral speed is realized which accordingly moves the washers and fasteners along the helical path 28 at a higher rate of speed. On the other hand, when the diameter of the wheel is decreased and the speed of the wheel is maintained, the rate at which the fastener moves along the cam surface 28 is decreased. The faster the fasteners move along the cam surface 28, the smaller the helix angle should be to provide a controlled rate at which the fasteners and washers are assembled. The helix angle H is also dependent on the distance through which the fastener is moved into an assembled relationship with the washer. The greater the distance that the fastener is to be moved for assembly along the axis 250, the greater the helix angle should be, of course, dependent on the speed of the parts and the type of fastener/- washer assembly involved and the type of washer/fastener assembly.

As can be seen from the above, the helix angle is dependent on the particular washers and fasteners to be assembled and the speed at which they move along the cam surface 28. In general, the more gradual the movement of the washer and fastener together the more smooth the operation of the machine will be. Each particular washer/fastener assembly has its own rate at which it may be assembled and the helix angle H must be determined accordingly.

The stationary arcuate cam 26 also includes a guide portion 476 having an inner peripheral surface 478 and an upper guide surface 480. The upper guide surface 480 provides a helical surface which is parallel to the helical cam surface 28 and spaced downwardly therefrom a distance at least as great as the thickness of the head portion 14 of the fastener 12. Accordingly, as the cam surface 28 moves the fastener 12 towards the washer 18, movement of the fastener is controlled.

The inner peripheral surface 478 extends downwardly from the upper guide surface 478 and is positioned adjacent to the shank 16 of the fastener 12. The inner guide surface 478 is helical in shape and is generated along a cylinder having a radius equal to the radius R of the path 354 plus the radius of the shank 16 of the fastener 12 plus some clearance distance. As the fastener 12 is moved in a helical path by the cam 26, the inner peripheral guide surface 478 maintains the axes of the washers 18 and fasteners 12 in alignment with each other and further control the movement of the fasteners as they are assembled with the washer.

FIGS. 19, 20 and 21 show the progressive movement of the fastener 12 along its helical path as it is assembled with the washer 18. After the fastener is captured by the cam 26, the top 13 of the head 14 of the fastener 12 comes into contact with the arcuate cam surface 28. The outer peripheral surface of the head 14 is positioned adjacent to a guide surface 482 of the guide portion 484. A portion of the shank 16 of the fastener 12 is adjacent to the inner peripheral surface 478 of the guide portion 476.

The guide surface 482 of the guide portion 484 provides a general helical surface generated about a radius equal to the radius R of the arcuate path of travel 354 plus the radius of the outer peripheral surface of the head 14 of the fastener 12 plus some clearance distance. The guide surface 482 provides for more ready control of the fastener 12 as it is assembled with the washer 18. The guide portions 476, 484 may be formed as an integral part of the base 468. In instances where the guide portions 476, 484 are separate members, the separate members may be secured to the base by any conventional means such as spot welding as shown or threaded fasteners.

The pocket portion 336 of the shank disc 294 also contacts a portion of the shank 16 of the fastener 12. The washer pocket surfaces 406 and 390 of the pocket portions 340, 342 provide for maintaining alignment between the washer and fastener as they are assembled.

As the assembly wheel is rotated, the cam surface 28 progressively moves the fastener 12 in a smooth, even, helical path and the washer is moved along a circular path. The fastener 12 correspondingly slides along the pocket portion 336 into the opening 20 in the fastener as seen in FIGS. 19 and 20. The annular chamfer surface 17 extending about the bottom of the shank 16 of the fastener 12 assists in the alignment of the washer and fastener. However, it is not necessary to provide such a chamfer to practice the present invention.

As rotation of the assembly wheel 32 continues, the washer/fastener assembly moves to a point shown in FIG. 21 where the parts are substantially assembled. In this position, the head 14 of the fastener 12 contacts a portion of the upper surface 264 of the shank disc 294 and the shank disc 294 and the support disc 300 retain the shank 16 of the fastener. Since the shank 16 extends through the opening 20 in the washer 18, the washer 18 is retained thereon.

The supports 462 provide for adjustably supporting the cam 26 with respect to the assembly wheel 32. The supports 462 allow for radial adjustment of the cam 26 towards and away from the assembly wheel and the vertical adjustment of the cam 26 along the rotational axis 330 of the assembly wheel 32 as seen in FIGS. 2, 4 and 19. The supports 286 and 430 for supporting the retainer and guide 278 and 424 respectively, are constructed in a manner similar to the supports 462.

The support member 462 includes a base 486 positioned adjacent to the base 30 of the apparatus 10. The base 486 has slots 488 therein through which the fasteners 490 extend. The fasteners 490 are threadedly engaged in the base 30 and when in cooperation with the slots 488 allow for radial adjustment of the cam 26 toward and away from the rotational axis 330 of the assembly wheel 32. Extending upwardly from the base portion 486 is an upwardly extending portion 492 secured to the base portion. As seen in FIG. 19, the upwardly extending portion 492 terminates in an upwardly extending threaded portion 494.

The support member 462 also includes an upper support member 498 having a base portion 500 with slots 502 therein. The upper support member 498 also has upwardly extending portions 504 to which the cam 26 is secured by any conventional means such as welding. The threaded fasteners 496 threadedly engage the threaded portion 494 and secure the base portion 500 of the upper support member to the base 486. Relative axial movement of the fasteners 496 provides for the vertical adjustment of the cam 26 and the radial slots 502 allow for further radial adjustment of the cam 26 with respect to the axis of rotation 330 of the assembly wheel 32. It should be understood that the supports 286 and 430 are constructed in a similar manner.

As seen in FIG. 22, the present invention also provides means 506 for ejecting washers from the assembly wheel 32 when they are adjacent to the cam 26 and no fastener is present. The washer ejector 506 includes a nozzle 508 having pressurized air supplied thereto by the conduit 510 as seen in FIG. 22. The conduit 510 is connected to the manifold 96 and consequently to the source of pressurized air 94. The nozzle 508 directs a stream of air upwardly through the shank retaining pocket surface 408.

A washer supported on the pocket surfaces 390, 406 of the pocket 34 in the assembly wheel 32 will be ejected by the stream of pressurized air if no fastener is present. The nozzle 508 is positioned with respect to the assembly wheel 32 so that if a fastener is present, the shank 16 of the fastener 12 partially extends through the opening 20 in the washer 18. Accordingly, the washer 18 is captured by the fastener 12 and accordingly will not be ejected. If on the other hand a fastener is not present, the washer will move in an outwardly radial direction through an opening 512 in the base 468 of the cam 26 and into a discharge chute 514 so that the washer may be reprocessed. This washer ejector device 506 reduces any jamming problems when a pocket 34 of the assembly wheel having a washer therein moves to a position adjacent to the washer feed track 58.

Means 42 are provided for removing the washer/fastener assembly from the assembly wheel 32. The assemby removal device 42 includes a cam member 516 as seen in FIGS. 4, 5 and 21. The cam member 516, which is adjustably secured to the base, is positioned in the space between the shank disc and washer disc 294, 298 respectively of the assembly wheel 32 and adjacent to the spacer disc 296. The spacer disc 296 has a greater thickness than the thickness of the cam member 516. The cam member 516 extends radially inwardly of the washer/fastener assembly on the assembly wheel 32. The cam surface 518 is positioned to contact the shank 16 of the fastener 12 after it is assembled with the washer 18 and in the position shown in FIG. 21. As the assembly wheel 32 continues to rotate past the position shown in FIG. 22, the cam surface 518 is shaped to cam the washer/fastener assembly out of the pocket 34 in the assembly wheel 32 and onto a pair of side tracks 524, 525. The side tracks 524, 525 and cam member 516 is secured to the base 30 by the support 532.

The side tracks 524, 525 have upper support surfaces 526, 520 respectively, and inner support surfaces 528, 522 respectively. The side tracks 524, 525 are positioned so that when the washer/fastener assemblies are removed from the wheel, the upper support surfaces 526, 520 are positioned underneath the washer 18 and the portion of the shank 16 extending through the opening 20 of the washer 18 is adjacent to the opposing inner support surfaces 528, 522 of the side tracks 524, 525 respectively. The opposing inner support surfaces 528, 522 are spaced from each other by a distance at least as great as the diameter of the shank 16 of the fastener 12.

As the assembly wheel 32 continues to rotate the washer/fastener assembly is removed from the assembly wheel and moves in a downwardly direction until it is supported by the tracks 524. The washer/fastener assemblies move by gravity down the side tracks 524, 525. The washer/fastener assemblies are restrained from lateral movement as they move along the track by the support surfaces 528, 522. Since the washer/fastener assembly is supported in a vertical direction by the washer 18, the fastener 12 continues to move in a vertical direction into a further assembled relationship with the fastener 18 by gravity. It should be understood that this type of device may be used in a sliding fit design but further assembly of the washer/fastener of the interference type will not occur by gravity.

After the washer/fastener assembly is removed from the assembly wheel 32 by the removing means 42, the pocket 34 in the assembly wheel 32 continues around in a peripheral path in the direction 322 to receive a washer from the track 58.

It should be understood that it is fully within the contemplation of this invention to feed the fasteners directly into the assembly wheel 32 from the fastener feed track 118 without the use of the feeder wheel 100. It should be further understood that a washer/fastener assembly may be assembled according to the present invention by the use of the series of assembly wheels between which the washer and fastener are transferred in a manner similar to that described in connection with the transfer of the fasteners from the feeder wheel 100 to the assembly wheel 32. So long as the peripheral speeds of the arcuate paths of travel of the pockets in those wheels are equal such a transfer may be readily effected.

The apparatus 540 shown in FIGS. 23-33 provides an apparatus for assembling a fastener 542 and washer 544 of the interference fit type as seen in FIGS. 28-33. It should be understood that the particular design of the fastener 542 and washer 544 is illustrative of only one type of interference fit type assembly and the apparatus 540 of the present invention may be utilized to assemble any fasteners and washers.

The fastener 542 has a head portion 546 and a shank portion 552. The head portion includes a wrench gripping portion 547 and an enlarged section 548. The top of the wrench gripping portion 547 defines the upper surface 549 of the head 546 and the lower surface of the enlarged portion 548 defines the lower surface 550 of the head 546. The enlarged portion also defines the outer peripheral surface 551 which is the largest outer peripheral surface of the fastener 542. The shank portion 552 is generally circular in cross-sectional figuration about an axis 250a' and has a predetermined diameter. The shank 552 terminates in the end 553.

The washer 544 is an assembly of a rubber member 544 and a reinforcing member 556. The reinforcing member includes an upper reinforcing portion 558 defining the upper surface 560 of the washer 544. The upper reinforcing portion 558 has a centrally located opening 562 therein having a diameter about an axis 250b' greater than the diameter of the shank 552. The reinforcing member 556 also includes an outer peripheral portion 564 defining the outer peripheral surface 566 of the washer 544. The rubber member 554 of the washer 544 is formed adjacent to the reinforcing member and extends radially inwardly from the outer peripheral portion 564 along the conical surface 570 to the opening 572 in the rubber member 554. The opening 572 has a diameter about the axis 250b' which diameter is less than the diameter opening 572 in the washer 544, and which is less than the diameter of the shank 552. Accordingly, substantial forces are necessary to urge the shank 522 of the fastener 542 through the opening 572 of the washer 544.

Figure 23:
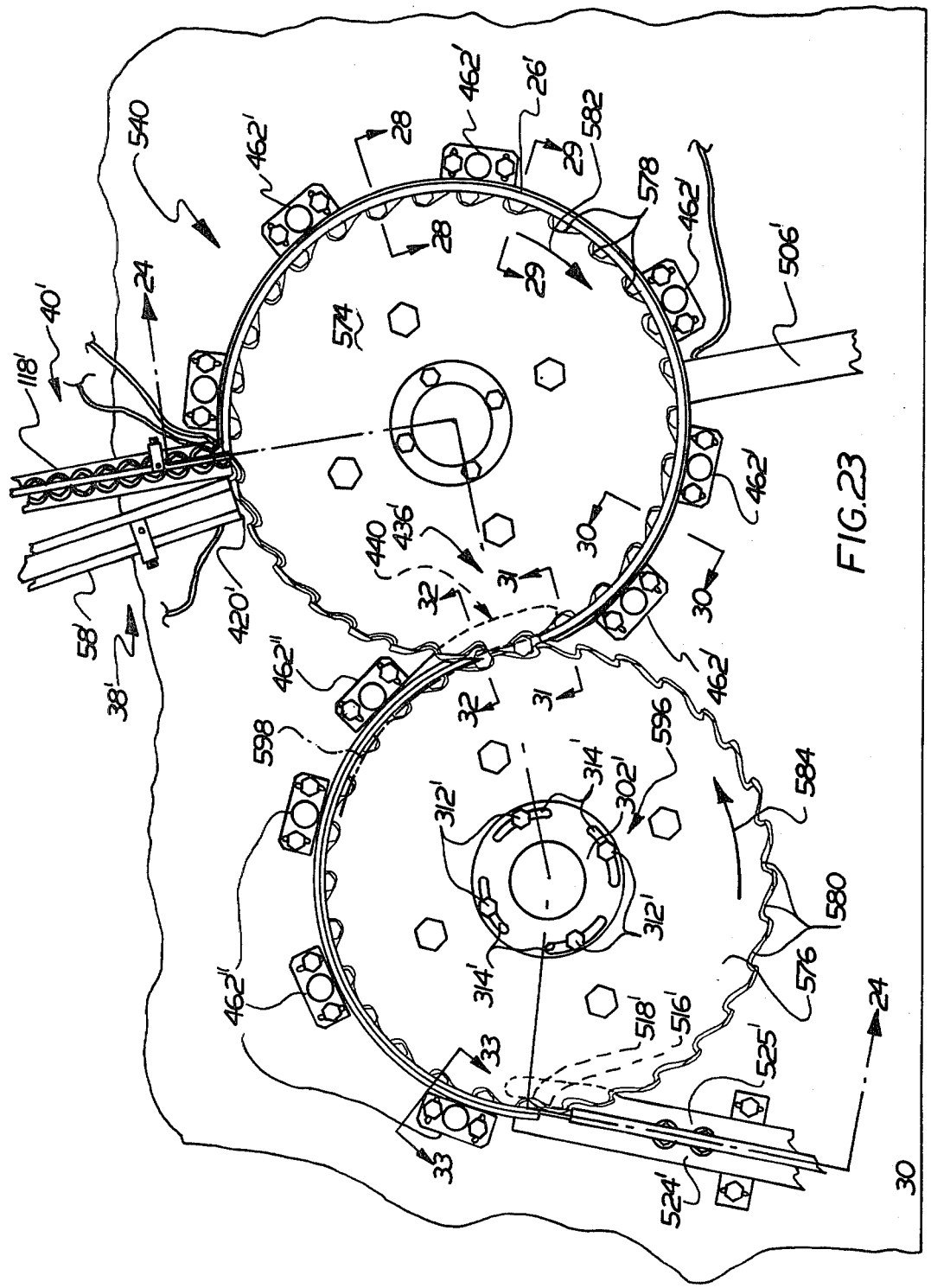
FIG. 23 is a partial plan view of a second embodiment of an apparatus for assembling washers and fasteners of the interference fit type which is representative of another embodiment of the present invention.

The apparatus 540 shown in FIGS. 23 and 24 includes a primary assembly wheel 574 and a secondary assembly wheel 576. The apparatus 540 is constructed in a similar manner to the apparatus 10 disclosed in FIGS. 1-22 with the primary assembly wheel 574 being positioned in place of the feeder wheel 10 and the secondary assembly wheel 576 being positioned in place of the assembly wheel 32. For purposes of illustration, a feeder wheel for feeding the fasteners into the primary assembly wheel 574 has not been shown but it should be understood that it is within the contemplation of this invention to provide such a feeder wheel similar to that described in connection with the feeder wheel 100 of the apparatus 10. As previously mentioned in connection with the apparatus 10, the fasteners may be fed directly onto an assembly wheel.

For ease of description and with the above substitution of the primary assembly wheel 574 and secondary assembly wheel 576 for the feeder wheel 100 and assembly wheel 32 of the apparatus 10 respectively, similar numerals will be used in describing similar features and parts of the apparatus 540 as the numerals as those used in connection with the apparatus 10 followed by a prime (') or double prime (") when a second such component is provided.

The primary and secondary assembly wheels 574, 576 respectively have pockets 578, 580 respectively therein for receiving and assembling the fasteners and washers 542, 544 therein. As shown in FIG. 23, the primary assembly wheel 574 rotates in a clockwise direction 582 and the secondary assembly wheel 576 rotates in a counter-clockwise direction 584. To rotate the assembly wheels 574, 576, a drive means is provided similar to the drive means 36 as described above in connection with the apparatus 10. The direction of rotation of the drive means is opposite though to provide for rotation of the assembly wheels 574, 576 in their respective directions 582, 584. The apparatus 540 also includes a means 38' for feeding washers and means 40' for feeding fasteners similar to that described in connection with the apparatus 10.

The assembly wheels 574, 576 are rotatably supported on a base of the apparatus 540 which base is similar in construction to the base 30 described above in connection with the apparatus 10. As seen in FIG. 24, the support means 183' supports the primary assembly wheel 574 on the base and the support means 323' supports the secondary assembly wheel 576 on the base.

The pockets 578 in the primary assembly wheel 574 are evenly spaced about the periphery thereof. The pockets 578 are sufficiently close to allow for the desired rate of assembly of the washers and fasteners. The space between the pockets 578 is also dependent on the shape and size of the fasteners and washers to be assembled.

For ease of description, one such pocket 578 will be hereinafter described. It should be understood that the pocket 578 has a similar geometric configuration and components as form the pocket 34 on the assembly wheel 32 described above in connection with the apparatus 10. For ease of description, the differences in the shape of the pockets 578 when compared to the pockets 34 will be hereinafter described.

As seen in the fragmentary sectional views shown in FIGS. 25 and 26, the primary assembly wheel 574 includes a fastener head disc 292', shank disc 294', a spacer disc 296', a washer disc 298', and a support disc 300'. The discs 292', 294', 296', 298', and 300' are assembled together in a manner similar to that described in connection with the assembly wheel 32. The pocket portion 334' of the disc 292' is provided with the outer peripheral surface 352' generated about a radius which is greater than the arcuate path of travel 585. The arcuate path of travel 585 describes the arc in which the axis 250a' of the fastener 542 travels when it is received in the pockets 578 and rotated about the rotational axis 231' of the primary assembly wheel 574. The arcuate path of travel 585 is a radial distance R' from the rotational axis 231'.

The pocket portion 334' has a pocket surface 344' having a retaining portion 356'. The retaining portion 356' is generated by a circle extending about the axis of rotation 250a' of the fastener when it is positioned a distance R' from the axis of rotation 231'. The retaining portion is sized to receive the outer peripheral surface 551 of the fastener 542 and has a diameter substantially equal thereto. The retaining portion 356' includes a hook portion 587 which extends circumferentially about a portion of the enlarged portion 548 radially away from the point of intersection between the arcuate path 585. The hook portion 587 operates to retain the fastener 542 in the pocket 578 during assembly thereof with the washer 544. This function is of substantial importance since when the pocket 578 passes the fastener feeder 118' a fastener is removed therefrom. Accordingly, the hook portion 587 eliminates the need for feeder bars and the like. The hook portion 587 is connected to the outer peripheral surface 352' by the radius portion 362'.

It is desirable to position the outer peripheral surface 352' close to the arcuate path of travel 585 to allow the cam surface 28' of the cam 26' to contact the fastener 542 close to the axis 250a'. When the cam surface 28' is so positioned, assembling forces may be exerted on the fastener with a minimum of canting and tipping of the fastener and maintaining axial alignment between the washer and fastener. The assembly force is exerted in an axial direction along the fastener 542.

The pocket surface 368' of the pocket portion 336' on the shank disc 294' is generally co-extensive with the lower surface 336' of the shank disc 294'. A beveled surface 586 has a generally funnel shape and extends upwardly from the pocket surface 368' towards the upper surface 364' of the shank disc 294' and outwardly away from the pocket surface 368' at a radius greater than the radius of the shank 552 of the fastener 524. The beveled surface 586 so extends away from the pocket surface 368' a uniform distance therefrom throughout the length of the pocket surface 336'. The beveled surface 586 provides for guiding the end 553 of the fastener 542 into communication with the pocket surface 368' as will be hereinafter more fully described.

The pocket surface 390' of the washer disc 298' is shaped to conform to the shape of the washer 544 so that a vertically extending portion 588, adjacent to the upper surface 386' and against which the outer peripheral portion 564 of the reinforcing member 566 of the washer 544 contacts and is received thereby. The pocket surface 390' also includes a beveled surface 590 extending between the vertically extending portion 588 and the lower surface 388' of the disc 298'. It should be understood that the vertically extending surface portion 588 and the beveled surface 590 extends throughout the entire length of the pocket surface 390'.

The support disc 300' provides a washer pocket surface 406' for supporting a portion of the rubber member 556 adjacent to the opening 572. The support disc 300' also includes a shank retaining portion 408' for retaining the shank 552 of the fastener 542 therein.

To begin the assembly of the fastener 542 and washer 544, the washer is first fed into the pocket 578 without the use of feeder bars or other intermittent motion devices. It is desirable to feed the washer 544 into the pocket 578 before feeding the fastener 542 into the pocket. The means 38' is provided for feeding washers into the pocket 578 and includes a track 58' having a series of washers therein. The track 58' is in radial alignment with the axis 231'. The outlet end 420' of the track 58' is in close proximity to the outer peripheral surfaces 394' and 412' of the assembly wheel 574. Preferably, the outer peripheral surfaces 394', 412' are in sliding contact with the end 420' of the track 58'.

The washer slides radially inwardly toward the axis 231' into the pocket 578. As the wheel 574 continues to rotate the washer slides into the pocket 578. When the washer is received in the pocket 578, the outer peripheral surface 566 and conical surface 570 are supported by the vertically extending portion 588 and beveled surface 590 of the pocket 578. The washer is retained in the pocket 578 by the hook portion 398' of the pocket 578. When the washer 544 is received in the pocket 578 and is rotated by the primary assembly wheel 574, the washer moves in an arcuate path of travel 585 having a radius equal to the distance between the rotational axis 231' and the rotational axis 250b' of the washer 544.

As seen in FIG. 24, the primary assembly wheel 574 is positioned adjacent to the outlet of the track 118'. The track 118' is radially aligned with the axis 231' and provides fasteners from its outlet end with a force urging the fasteners radially inwardly toward the axis 231' of the primary assembly wheel 574. The track 118' is positioned so that the head 546 of the fastener 542 is received by the pocket surface 334' and the outer peripheral surface 551 of the fastener is engaged by the pocket surface 334'. The fastener slides down the lead in portions 350' and 370'. The hook portion 578 of the pocket surface 334' grips the head 547 of the fastener 542 and the fastener begins its movement about an arcuate path of travel 585 in the direction of rotation 582. The fastener feeder track 118' is positioned so that end 553 of the fastener 542 is received above the pocket portion 336.

Accordingly, the fastener 542 is received in the pocket 578 of the primary assembly wheel 574 without the use of any feeder bars or other intermittent motion type devices. It should also be understood that an assist may be provided as described above in connection with the air jet 276' seen in FIG. 23.

After the pocket 578 receives a fastener 542 from the track 118', the next succeeding pocket 578 rotates toward the feeder track 118' to receive a fastener therefrom.

After the fastener and washer 542, 544 are received in the pocket 578, the primary assembly wheel 574 continues to rotate in a direction 582 and adjacent to a stationary arcuate cam 26' as seen in FIG. 23. The stationary arcuate cam 26' is secured to the base 30' of the machine 540 by the supports 462'. As seen in FIG. 27, the stationary arcuate cam 26' has a helical cam surface 28'. The cam surface 28' has a generally helical shape and provides for moving a plurality of the fasteners along a helical path as the primary assembly wheel 574 is rotated to thereby effect simultaneous movement between a plurality of the fasteners and washers. The cam surface 28' is positioned to contact the upper surface 549 of the fastener 542. The cam surface 28' is generally helical in configuration at a predetermined helix angle H'.

As described above, the helix angle H' is the constant angle between the tangent to a helix and a generator of the cylinder upon which the helix lies. In the case of an interference fit, since the frictional forces resisting assembly of the fastener and washer are substantial, the helix angle H' of 15° should not be exceeded.

The cam surface 28' has an outer portion 28a' which is generated about a radius greater than the radius R plus the radius of the outer peripheral surface 551 of the fastener 542. The helical cam surface 28' has an inner portion 28b' which is generated radially inwardly a distance as close as possible or equal to the radius R of the arcuate path of travel 598. Accordingly, the helical cam surface 28' will exert forces on the upper surfaces 549 of the fastener 542 about the axis of rotation 250a' of the fastener or as close thereto as possible. This radially inwardly extending helical cam surface substantially at the rotational center of the fastener allows for greater forces to be exerted on the fastener without excessive canting or tipping of the fastener and assists in maintaining the alignment between the fastener and the washer.

Figure 28:
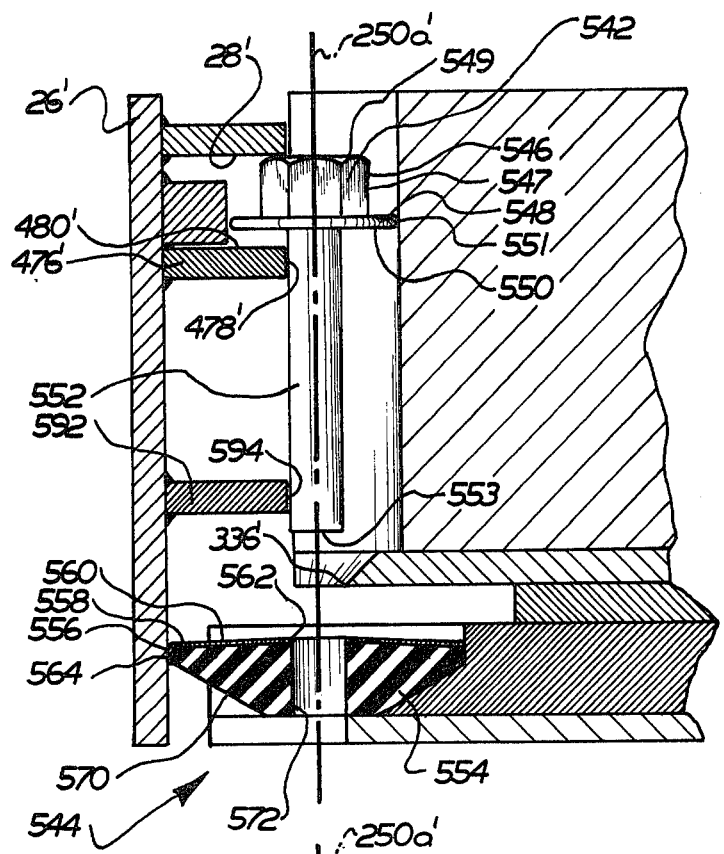
FIGS. 28, 29 and 30 are sectional views of portions of the first assembly wheel and its associated arcuate cam shown in FIG. 23 during assembly of the fasteners and washers thereby.
Figure 29:
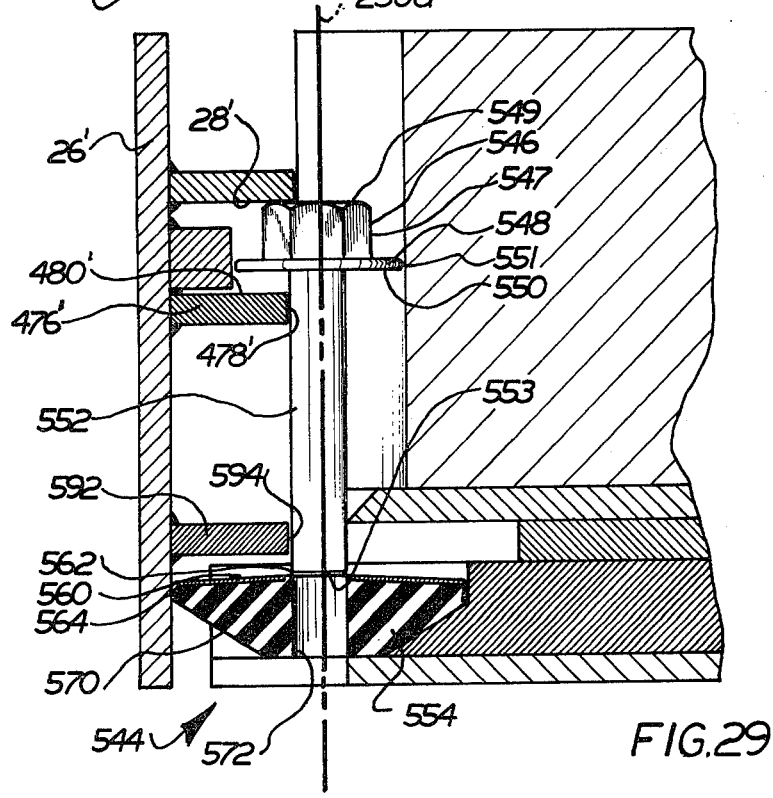
Figure 30:
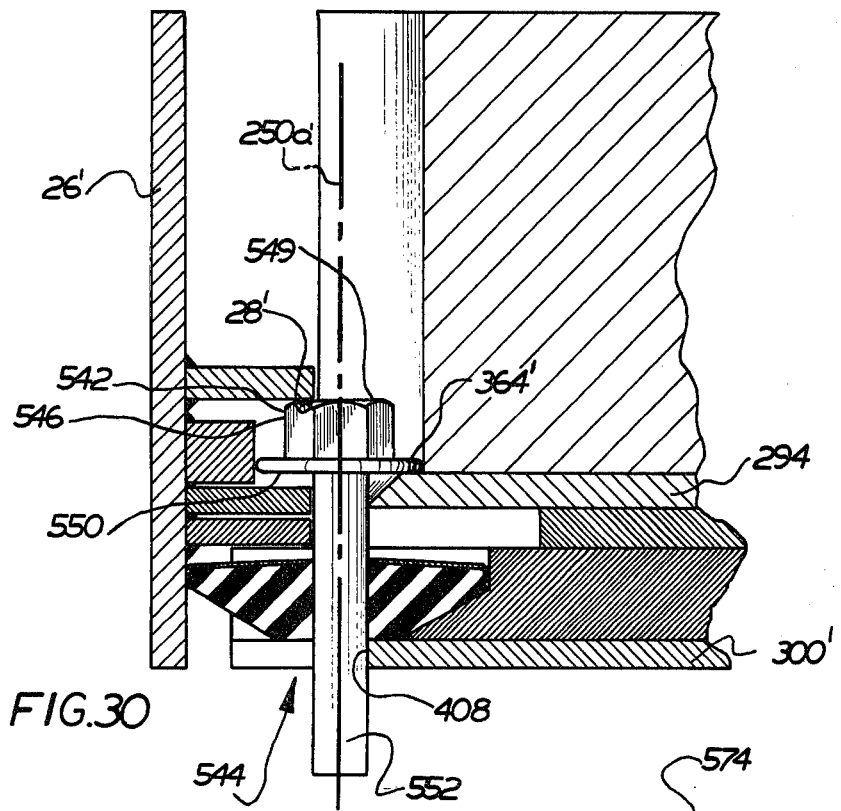

As the fastener 542 moves along the helical surface 28' it is driven into communication with the fastener and the washer 544 as seen in FIGS. 28, 29 and 30. As seen in FIG. 28, when the head 546 of the fastener 542 is captured between the arcuate cam surface 28' and the guide surface 480', the upper surface 549 of the head 546 is adjacent to the cam surface 28' and the lower surface 550 of the head 546 is adjacent to the upper guide surface 480' of the cam 26'. The cam 26' includes a shank guide portion 592 spaced from the guide portion 476' of the cam 26'. The inner peripheral surfaces 478', 594 of the guide portions 476', 592 respectively, are spaced from each other and are in alignment with the axis 250' of the pocket 578 so as to prohibit movement of the shank 552 radially outwardly of the axis 250'. The axis 250' is the axis of the pocket 578 along which the axis 250a' and 250b' of the fastener and washer 542, 544 respectively lie when they are in aligned relationship in the pocket 578.

As the fastener is moved by the cam surface 28' in a helical path, a force is exerted on the fastener to move the fastener in a downward direction. As the fastener moves in a downward direction, the end 553 of the shank is moved through the pocket portion 336'. If the shank 552 is out of alignment as the fastener moves in a downward direction, the end 553 of the fastener contacts the beveled surface 586. As the end 553 of the fastener moves downwardly on the beveled surface 586, the fastener is brought into alignment with the washer. The inner peripheral surfaces 478, 594 of the arcuate cam 26' continue to restrain outward radial movement of the fastener and the pocket portion 336' prohibits radial and arcuate movement of the fastener so that the fastener is maintained in alignment with the washer.

When the end 553 of the fastener 542 comes into contact with the restricted opening 572 in the washer 544 the further downward movement of the fastener is resisted by the interference fit between the fastener 542 and washer 544. The cam 26 then exerts substantial forces on the fastener 542 through the cam surface 28' to assemble the washer and fastener. The cam 26' continues to move the fastener into further telescopic assembled relationship with the washer as the pocket 578 continues in its arcuate path. As can be seen in FIG. 30, the guide portions 476, 592 are shaped towards each other so as to allow continued movement of the fastener towards the washer. As the fastener continues its downward movement, the shank portion 552 comes into contact with and slides along the shank pocket surface 408' of the support disc 300'. The shank surface 408' provides for further guiding of the fastener as it moves into further assembled relationship with the washer.

As seen in FIG. 30, the cam 26' moves the fastener 542 into an assembly relationship with the washer 544 until the lower surface 550 of the head 546 of the fastener is in contact with the upper surface 364' of the shank disc 294'. Accordingly, further continued downward movement of the fastener 542 is restricted. The primary assembly wheel of 574 continues to rotate and the partially assembled washer and fastener moves into the transfer area 436'.

Figure 31:
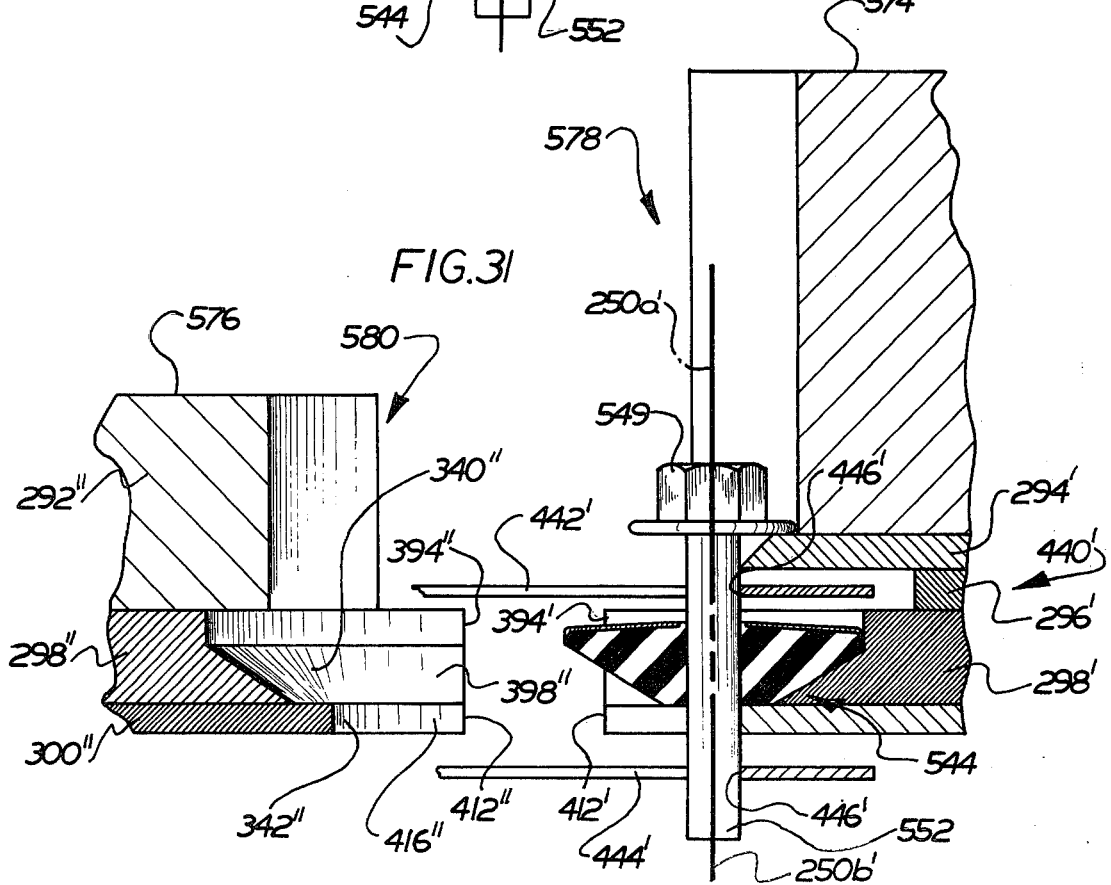
FIG. 31 is a sectional view of the first and second assembly wheel shown in FIG. 23 and taken along line 31—31 thereof.

The transfer of the fastener from the assembly wheel 574 to the assembly wheel 576 is accomplished by use of a transfer device 440'. The transfer device 440', particularly as seen in FIG. 31, includes the cam members 442' and 444' each of which have identical cam surfaces 446' thereon. The cam member 442' is positioned between the shank disc and washer disc 294', 298' respectively and adjacent to the spacer disc 296'. The cam member 444' is positioned so that it is below the assembly wheel 574 and adjacent to the shank of the fastener.

When the fasteners on the assembly wheel 574 reach the transfer area 436', the transfer cam surfaces 446' on the members 442', 444' come into contact with the shank 552 of the fastener, as generally seen in FIG. 31. As the assembly wheel 574 continues to rotate, the transfer cam surfaces 446' urge the fastener out of the pocket 578 in the assembly wheel 574 and towards the assembly wheel 576. The transfer cam surface 440' moves the shank of the fastener out of the hook portion 587 as the fastener moves toward the secondary assembly wheel 576.

It is important to understand the relative angular position of the pockets 578 and 580 upon transfer of the fastener therebetween. It is preferable that the pockets 580 be in a timed relationship with respect to the pockets 578 on the primary assembly wheel and slightly in advance thereof. Means 596 are provided to adjust the timing between the pockets 578, 580. The adjusting means includes the bolts 312' and arcuate slots 314 in the collar 302' seen in FIGS. 23 and 24.

To more clearly understand the transfer of the partially assembled washer and fastener, the pockets 580 in the secondary assembly wheel 576 will be hereinafter described. As seen in FIG. 31, the secondary assembly wheel 576 includes a fastener head disc 292", washer disc 298", and support disc 300". The discs 292", 298", and 300" are of the same construction as the discs 292', 298' and 300'. It should be understood though that the thickness of the disc 292" is less than the thickness of the disc 292' since the head 546 of the fastener 542 is not moved through as great a distance as is in the primary assembly wheel 574.

It should also be understood that since the fastener washer assembly is captured by the hook portions 398" and 416" of the pocket 580, that the fastener head disc 292" need not have the hook portion 587 thereon. It may be desirable to eliminate the hook portion 587 so as to allow the cam surface 28" to contact the fastener radially inwardly of the rotational axis 250' of the fastener 542. The hook portions 398" and 416" on the secondary assembly wheel 576 are sufficient to retain the partially assembled washer and fastener assembly in the pocket 580. As can be seen in FIG. 31, one difference between the assembly wheels 574 and 576 is that a disc similar to the shank disc 594' is not provided in the secondary assembly wheel 576. As can be seen in FIG. 31, the absence of the shank disc allows for complete assembly by the washer and fastener 542, 544 respectively.

By positioning the pockets 580 of the assembly wheel 576 slightly in advance of the pockets 578, the transfer cam members 442', 444' smoothly transfer the washer fastener assembly from the pockets 578 in the assembly wheel 574 to the lead in surfaces 392", 410" of the pocket 580. The transfer cam members 442', 444' allow the partially assembled washers and fasteners to move downstream on the lead in surface 392", 410" until the washer and shank are seated and retained in the pocket portions 340", 342". When the washer and fastener assembly is so seated, the washer is retained by the hook portion 398" and the shank of the fastener is retained by the hook portion 416".

Figure 32:
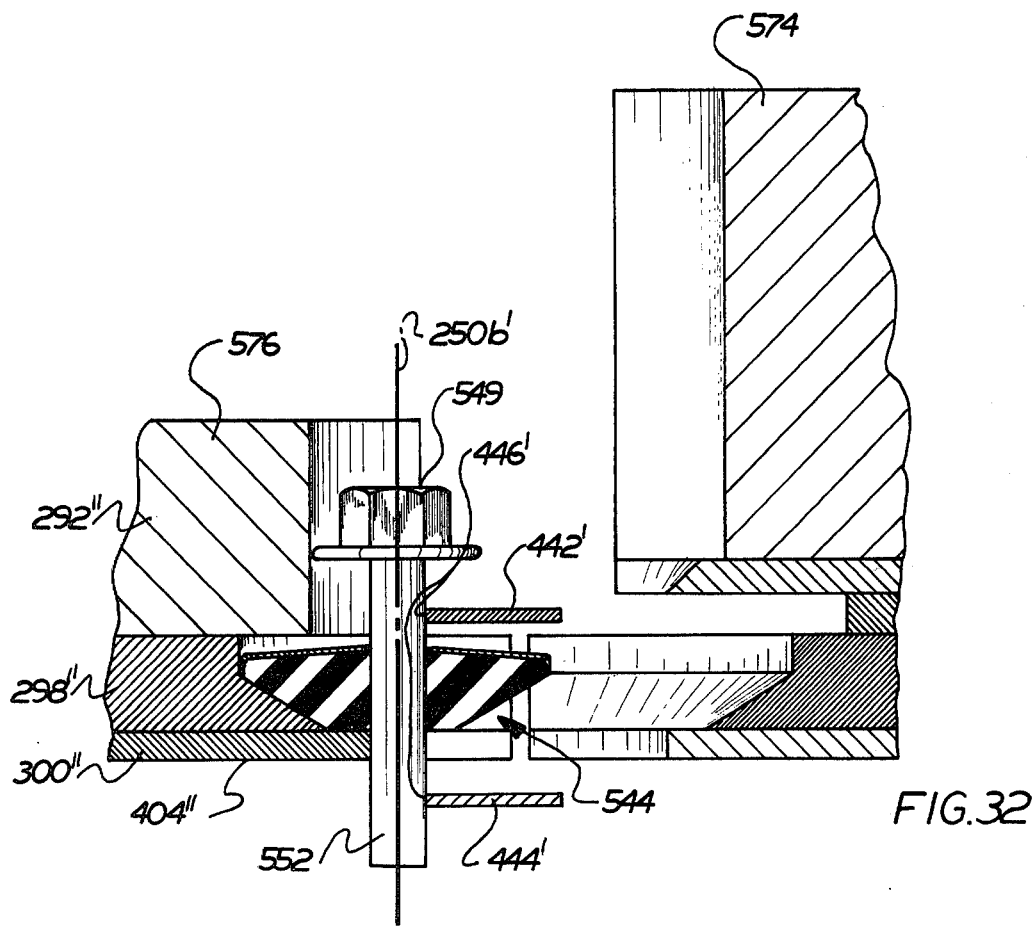
FIG. 32 is a sectional view of the first and second assembly wheel shown in FIG. 23 and taken along line 32—32 thereof.

When the transfer of the partially assembled washers and fasteners is thereby completed as seen in FIG. 32, the axis 250a' of the fastener 542 is in axial alignment with the axis 250b' of the washer 544. When both axes 250a' and 250b' are coincident with the axes 250" as described hereinable, the surfaces 446' of the transfer cam have relief surface portions 452' which move away from contact with the shank of the fastener as the partially assembled washers and fasteners begin their arcuate movement about the secondary assembly wheel 576. The partially assembled washers and fasteners move in an arcuate path 598 about the axis 330 as seen in FIGS. 23 and 24. The arcuate path 598 is a circular path described by the radius R' extending about the axis 330' and indicates the path of rotation of the centerline 250' of the partially assembled washer and fasteners.

At this point it should be understood that for purposes of illustration the assembly wheels 574, 576 provide for movement of the washers and fasteners about paths of equal radius R'. It should be understood though that these radii may be changed so long as the peripheral speed at which the washers and fasteners move about the arcuate path 585 and 598 are equal.

Figure 33:
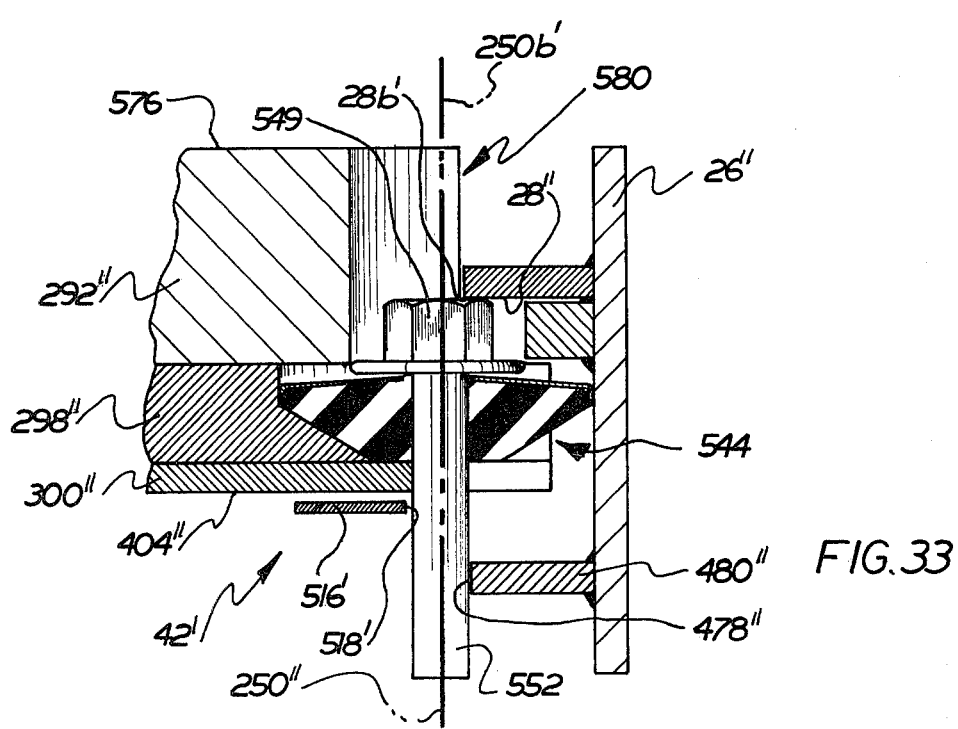
FIG. 33 is a partial cross-sectional view of the second assembly wheel shown in FIG. 23 and taken along line 33—33 thereof.

After the partially assembled washers and fasteners move past the transfer device 440 shown in FIG. 32 in the arcuate direction 584, the cam 26" shown in FIG. 33 is provided to control the relative movement of the washers and fasteners.

The stationary arcuate cam 26" has a helical cam surface 28". The cam surface 28" has a generally helical shape and provides for moving a plurality of the fasteners along a helical path as the primary assembly wheel 576 is rotated to thereby effect simultaneous movement between a plurality of the fasteners and washers. The cam surface 28" is positioned to contact the upper surface 549 of the fastener 542. The cam surface 28" is generally helical in configuration at a predetermined helix angle.

The cam surface 28" has an outer portion 28a" which is generated about a radius greater than the radius R plus the radius of the outer peripheral surface 551 of the fastener 542. The helical cam surface 28' has an inner portion 28b" which is generated radially inwardly a distance preferably equal to the radius R of the arcuate path of travel 598. Accordingly, the helical cam surface 28" will exert forces on the upper surface 549 of the fastener 542 about the axis of rotation 250a' of the fastener or as close thereto as possible. This radially inwardly extending helical cam surface contacts the fastener substantially at the rotational center of the fastener without excessive canting or tipping of the fastener so that alignment between the fastener and the washer is maintained.

The cam 26" includes a shank guide portion 480" having an inner peripheral surface 478" is in alignment with the axis 250" of the pocket 580 to prohibit movement of the shank 552 radially outwardly of the axis 250". The axis 250" is the axis of the pocket 580 along which the axis 250a' and 250b' of the fastener and washer 542, 544 respectively lie when they are in aligned relationship in the pocket 580.

As the fastener 542 moves along the helical surface 28" it is driven into communication with the fastener and the washer 544 as seen in FIG. 33. The upper surface 549 of the head 546 is adjacent to the cam surface 28" and the lower surface 550 of the head 546 is adjacent to the washer and is assembled therewith.

After assembly of the washers 544 and fasteners 542 is completed as shown in FIG. 33, means 42' are provided for removing the washer fastener assembly from the secondary assembly wheel 576. The washer fastener assembly removal device 425 includes a cam member.

516' which is adjustably secured to the base 30'. The cam member 516' is positioned adjacent to the lower surface of the 404" of the support disc 300" and contacts the shank of the fastener 542 as the washer fastener assembly is removed from the assembly wheel 576.

As the assembly wheel 576 continues to rotate, the cam surface 518' is shaped to cam the washer fastener assembly out of the pocket 580 and onto a pair of side tracks 524', 525'. The side tracks 524', 525' are positioned so that when the washer and fastener assemblies are removed through the wheel the upper support surfaces 526', 520' are positioned underneath the washer 544. The shank of the fastener 542 is positioned adjacent to the inner support surfaces 528', 522' and the side tracks 524', 525' respectively. The washer fastener assemblies are accordingly removed from the apparatus 540 as they move along the tracks 524', 525'.

As seen in FIG. 23, the present invention also provides means 506' for ejecting washers from the primary assembly wheel 574 when no fastener is present.

It should be understood that it is within the contemplation of this invention that a feeder wheel be used to feed the fasteners 542 into the primary assembly wheel 574 and accordingly eliminate the need for the hook portion 587 to allow the cam surface 28' to be positioned further inwardly. Accordingly, the cam surface 28' may extend radially inwardly of the center 250a' of the fastener 542.

It should also be further understood that the helix angle should preferably be as small as possible which would provide for high speed operation. When the helix angle is small and the length through which the shank of the fastener is to be moved is substantial, the length of the arcuate cams 26', 26" must be increased. As can be seen in the apparatus 540, two assembly wheels have been utilized to extend the effective length of the helical cam. It should be understood that if the fastener is to be moved greater shank lengths, the diameter of the assembly wheels may be increased or additional subsequent assembly wheels may be provided.

Having described my invention I claim:

1. An apparatus for assembling washer members on axially extending shank portions of fastener members including
   a base,
   an assembly wheel rotatably mounted on said base about an axis of rotation,
   said assembly wheel having a plurality of pockets about the periphery thereof, each of said pockets adapted to receive a washer and a fastener therein in alignment with each other about an axis a distance R from the axis of rotation of said assembly wheel.
   means for rotating said assembly wheel about its axis of rotation,
   means for feeding the washers in an oriented position into said pockets of said wheel,
   means for feeding the fasteners in an oriented position into said pockets of said wheel,
   said pockets having at least one hook portion extending radially outwardly of the radius of rotation R on the upstream side of said pocket and downstream of the intersection of the radius of rotation R and the upstream side of said pocket,
   a stationary arcuate cam secured to said base and extending about a portion of the periphery of said wheel after the washers and fasteners are received in said pockets of said wheel, said arcuate cam having an arcuate cam surface means for moving a plurality of one of the fasteners and the washers along a helical path and thereby effecting simultaneous relative movement between the fasteners and washers in the pockets by increasing the telescopic assembled relationship between the shank portions of the fasteners and washers and
   means for removing the fasteners and washers from said pockets of said wheel after the telescopic assembled relationship of the fasteners and washers is increased.

2. An apparatus for assembling washer members on axially extending shank portions of fastener members as described in claim 1 wherein each of said pockets has a fastener receiving portion and a washer receiving portion, each of said fastener receiving portions having at least one hook portion extending radially outwardly of the radius of rotation R on the upstream side of said fastener receiving portion of said pocket and downwardly of the intersection of the radius of rotation R and the upstream side of said fastener receiving portion and each of said washer receiving portions of said pockets having at least one hook portion extending radially outwardly of the radius of rotation R on the upstream side of said washer receiving portion of said pocket and downstream of the intersection of the radius of rotation R and the upstream side of said fastener receiving portion.

3. An apparatus for assembling washer members on axially extending shank portions of fastener members as described in claim 1 wherein said pockets have an arcuate retaining portion and a lead in surface portion extending in a downstream direction from said arcuate retaining portion and inclined at a lead in angle in a radially outwardly direction.

4. An apparatus for assembling washer members on axially extending shank portions of fastener members as described in claim 1 in which said arcuate cam has an arcuate cam surface means extending adjacent to the axis of the fastener and washer when in said pockets for moving a plurality of one of the fasteners and the washers along a helical path having a helix angle of less than 35° and thereby effecting simultaneous relative movement between a plurality of fasteners and said washers by increasing the telescopic assembled relationship between the shank portions of the fasteners and washers, said arcuate cam having an upper guide surface positioned adjacent said cam surface means a sufficient distance so that a portion of said one of the fasteners and the washers in said pockets is positioned between said upper guide surface and said arcuate cam surface means during assembly of the fasteners and washers.

5. An apparatus for assembling washer members on axially extending shank portions of fastener members including
   a base,
   an assembly wheel having a plurality of pockets about the periphery thereof, each of said pockets adapted to receive a fastener and a washer therein in alignment with each other about an axis, said wheel rotatably mounted on said base,
   means for continuously rotating said wheel at a predetermined speed about an axis,
   means for feeding the washers in an oriented position into said pockets of said wheel,
   means for feeding the fasteners in an oriented position into said pockets of said wheel, a stationary arcuate cam secured to said base and extending about a portion of the periphery of said wheel after the washers and fasteners are received in said pockets of said wheel, said arcuate cam having an arcuate cam surface means extending adjacent to the fastener and washer alignment axis of said pockets for moving a plurality of one of the fasteners and the washers along a helical path having a helix angle of less than 35° and thereby effecting simultaneous relative movement between the fasteners and washers in said pockets by increasing the telescopic assembled relationship between the shank portions of the fasteners and washers, said arcuate cam having an upper guide surface positioned adjacent said cam surface means a sufficient distance so that a portion of said one of the fasteners and the washers in the pockets is positioned between said upper guide surface and said arcuate cam surface means during assembly of the fasteners and washers, and means for removing the fasteners and washers from said pockets of said wheel after the telescopic assembled relationship of the fastener and washers is increased.

6. An apparatus for assembling washer members on axially extending shank portions of fastener members as described in claim 5 wherein said arcuate cam surface means for assembling washer members and fastener members of the interference fit type has a helix angle of less than 15°.

7. An apparatus for assembling washer members on axially extending shank portions of fastener members as described in claim 5 in which each of said pockets are adapted to receive a washer and a fastener therein in alignment with each other about an axis a distance R from the axis of rotation of said assembly wheel, said pockets having at least one hook portion extending radially outwardly of the radius of rotation R on the upstream side of said pocket and downstream of the intersection of the radius of rotation R and the upstream side of said pocket.

8. An apparatus for assembling washer members on axially extending shank portions of fastener members including a base, a first assembly wheel rotatably mounted on said base about an axis of rotation, said first assembly wheel having a plurality of pockets about the periphery thereof, each of said pockets adapted to receive a washer and a fastener therein in alignment with each other about an axis a distance R from the axis of rotation of said first assembly wheel, means for rotating said first assembly wheel about its axis of rotation at a predetermined speed, means for feeding the washers in an oriented position into said pockets of said wheel, means for feeding the fasteners in an oriented position into said pockets of said first assembly wheel, a first stationary arcuate cam secured to said base and extending about a portion of the periphery of said first wheel after the washers and fasteners are received in said pockets of said first wheel, said arcuate cam having an arcuate cam surface means for moving a plurality of one of the fasteners and the washers along a helical path and thereby effecting simultaneous relative movement between the fasteners and washers in the pockets of said first wheel by increasing the telescopic assembled relationship between the shank portions of the fasteners and washers, a second assembly wheel rotatably mounted on said base about an axis of rotation and having a plurality of pockets about the periphery thereof, each of said pockets adapted to receive a washer and a fastener therein in alignment with each other about an axis a distance R' from the axis of rotation of said second assembly wheel, said second assembly wheel positioned on said base with the path of the alignment axis of the pockets thereon being tangentially adjacent to the path of the alignment axis of the pockets on said first assembly wheel, means for continuously rotating said second assembly wheel at a predetermined speed about an axis at which the peripheral speed of the pockets on said second assembly wheel is substantially the same as the peripheral speed of the pockets on said first assembly wheel, said second assembly wheel rotatable in the opposite direction of rotation as said first assembly wheel, means for transferring the fasteners from said pockets of said first assembly wheel to said pockets of said second assembly wheel, said pockets in said second assembly wheel are angularly positioned in advance of said pockets on said first assembly wheel to facilitate the transfer of the fasteners and washers from the pockets in said first wheel to the pockets in said second wheel, a second stationary arcuate cam secured to said base and extending about a portion of the periphery of said second wheel after the washers and fasteners are received in said pockets of said second wheel, said arcuate cam having an arcuate cam surface means for moving a plurality of one of the fasteners and the washers along a helical path and thereby effecting simultaneous relative movement between the fasteners and washers in the pockets of said second wheel by increasing the telescopic assembled relationship between the shank portions of the fasteners and washers and means for removing the fasteners and washers from said pockets of said wheel after the telescopic assembled relationship of the fasteners and washers is increased.

9. An apparatus for assembling washer members on axially extending shank portions of fastener members as described in claim 8 which includes means for adjusting the alignment between said pockets on said first wheel and said pockets on said second wheel.

10. An apparatus for assembling washer members on axially extending shank portions of fastener members as described in claim 8 wherein said pockets in at least one of said assembly wheels having at least one hook portion extending radially outwardly of the radius of rotation on the upstream side of said pocket and downstream of the intersection of the radius of rotation and the upstream side of said pocket.

11. An apparatus for assemblying washer members on axially extending shank portions of fastener members as described in claim 8 in which one said arcuate cam surfaces extends adjacent to the fastener and washer alignment axis in said pockets in one of said wheels for moving a plurality of one of the fasteners along a helical path having a helix angle less than 35°, one of said arcuate cams having an upper guide surface positioned adjacent said cam surface a sufficient distance so that a portion of said one of the fasteners and the washers in the pockets is positioned between said upper guide surface and said arcuate cam surface during assembly of the fasteners and the washers.

* * * * *

UNITED STATES PATENT AND TRADEMARK OFFICE
CERTIFICATE OF CORRECTION

PATENT NO. : 4,309,787

DATED : January 12, 1982

INVENTOR(S) : Gerhard Güenter Lapohn

It is certified that error appears in the above—identified patent and that said Letters Patent is hereby corrected as shown below:

```
Column 7, line 14 change the word "hinged" to --hinge--.
Column 7, line 16 change the word "hinged" to --hinge--.
Column 8, line 46 change the word "the" to --and--.
Column 10, line 32 change the numeral "83" to --183--.
Column 11, line 15 change the word "will" to --well--.
Column 12, line 26 add at the end of the line the word --in--.
Column 12, line 45 change the numeral "150b" to --250b--.
Column 12, line 51 change the word "form" to --from--.
Column 12, line 54 change the word "wooble" to --wobble--.
Column 22, line 38 change the numeral "244" to --224--.
Column 22, line 59 change the word "to" to --at--.
Column 28, line 24 change the numeral "544" to --554--.
Column 28, line 48 change the numeral "10" to --100--.
Column 30, line 17 change the numeral "336" to --366--.
Column 34, line 2 change the word "hereinable" to
   --hereinabove--.
```

UNITED STATES PATENT AND TRADEMARK OFFICE
CERTIFICATE OF CORRECTION

PATENT NO. : 4,309,787
DATED : January 12, 1982
INVENTOR(S) : Gerhard Güenter Lapohn It is certified that error appears in the above—identified patent and that said Letters Patent is hereby corrected as shown below:

Column 35, line 3 delete the words "of the" only as they first appear.

Signed and Sealed this

Twenty-second Day of June 1982

[SEAL]

Attest:

Attesting Officer

GERALD J. MOSSINGHOFF

Commissioner of Patents and Trademarks